United States Patent
Damia-Levy

(10) Patent No.: US 12,249,951 B1
(45) Date of Patent: Mar. 11, 2025

(54) COST-OPTIMIZATION AND ENERGY YIELD OPTIMIZATION DEVICE FOR UTILITY-SCALE PHOTOVOLTAIC POWER PLANTS

(71) Applicant: Javier Damia-Levy, Phoenix, AZ (US)

(72) Inventor: Javier Damia-Levy, Phoenix, AZ (US)

(73) Assignee: AZTEC ENGINEERING GROUP, INC., Phoenix, AZ (US)

( * ) Notice: Subject to any disclaimer, the term of this patent is extended or adjusted under 35 U.S.C. 154(b) by 311 days.

(21) Appl. No.: 17/658,313

(22) Filed: Apr. 7, 2022

Related U.S. Application Data

(63) Continuation-in-part of application No. 16/843,159, filed on Apr. 8, 2020, now Pat. No. 11,301,790.

(60) Provisional application No. 62/831,296, filed on Apr. 9, 2019.

(51) Int. Cl.
  *H02S 20/32* (2014.01)
  *G05B 19/042* (2006.01)
  *H02J 3/38* (2006.01)

(52) U.S. Cl.
  CPC ............ *H02S 20/32* (2014.12); *G05B 19/042* (2013.01); *H02J 3/381* (2013.01); *G05B 2219/2639* (2013.01); *H02J 2203/20* (2020.01); *H02J 2300/24* (2020.01)

(58) Field of Classification Search
  CPC .. G06Q 10/06313; G06Q 10/04; G06Q 50/08; H02S 20/32; G05B 19/042; G05B 2219/2639; H02J 3/381; H02J 2203/20; H02J 2300/24
  USPC ........................................................ 705/7.23
  See application file for complete search history.

(56) References Cited

U.S. PATENT DOCUMENTS

| | | | | |
|---|---|---|---|---|
| 2014/0331198 | A1* | 11/2014 | Bischoff | H02S 20/10 716/135 |
| 2015/0331972 | A1* | 11/2015 | McClure | G06F 17/11 703/2 |
| 2018/0075169 | A1* | 3/2018 | Koch | A01B 79/005 |
| 2020/0139954 | A1 | 5/2020 | Wallstedt et al. | |

(Continued)

FOREIGN PATENT DOCUMENTS

| | | | | |
|---|---|---|---|---|
| KR | 1940313 B1 * | 1/2019 | | G01S 17/88 |
| KR | 101940313 | 1/2019 | | |
| WO | WO-2019084454 A1 * | 5/2019 | | |

OTHER PUBLICATIONS

Galtieri, et al., Impact of Differential Power processing on Inter-row Shading in Solar Arrays, 2015 IEEE 16th Workshop on Control and Modeling for Power Electronics (COMPEL), pp. 1-8 (Jul. 2015) (Year: 2015).*

(Continued)

*Primary Examiner* — Charles Guiliano
(74) *Attorney, Agent, or Firm* — Venjuris, P.C.

(57) ABSTRACT

This invention is embodied in an energy yield optimization device that can be used to optimize energy yields for a utility-scale photovoltaic power plant. More specifically, this solution is directed to utility-scale photovoltaic power plants that have undulating (non-planar) topography. Because of the undulating topography, the rotating axles of the solar trackers will not necessarily be horizontal and would be expected to be different for each independent rotating axle in the field. The preferred solution claimed herein deploys a marching algorithm to find the preferred optimum solution.

3 Claims, 29 Drawing Sheets

(56) References Cited

U.S. PATENT DOCUMENTS

2021/0103303 A1* 4/2021 Sharp .................... G01S 3/7861
2021/0141966 A1 5/2021 Koch et al.

OTHER PUBLICATIONS

Li, Using GIS and Remote Sensing Techniques for Solar Panel Installation Site Selection, MS thesis. University of Waterloo (2013), available at https://uwspace.uwaterloo.ca/handle/10012/7960 (Year: 2013).

Mahapatra, et al., Future Aspects Solar Panel Installation on Closed Landfills, 4 International Journal of Advances in Engineering & Technology 2 at p. 324 (2012) (Year: 2012).

* cited by examiner

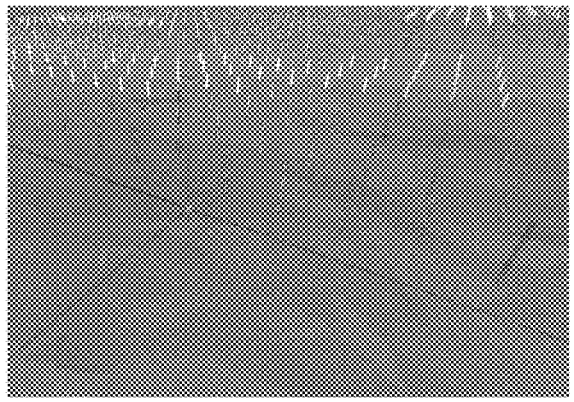
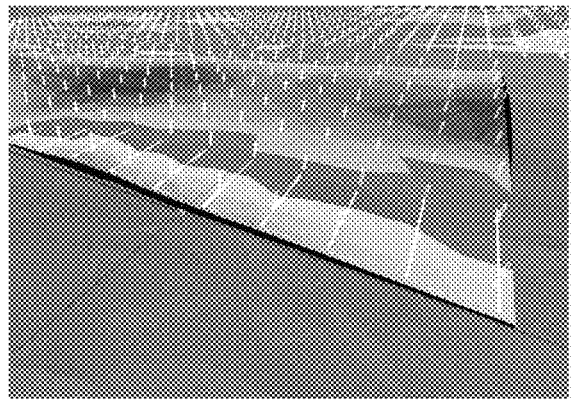
Fig. 15　　　　　　　　　　　　　　Fig. 16
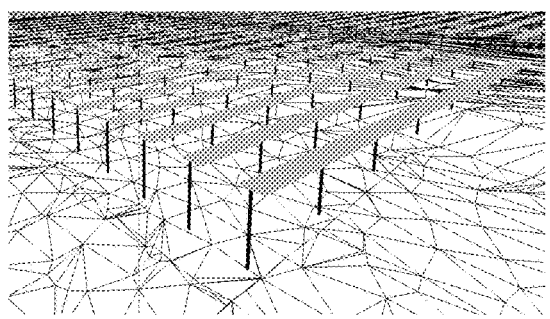
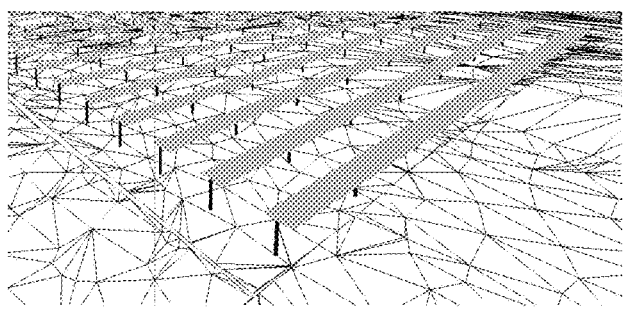
Fig. 15A　　　　　　　　　　　　　Fig. 16A

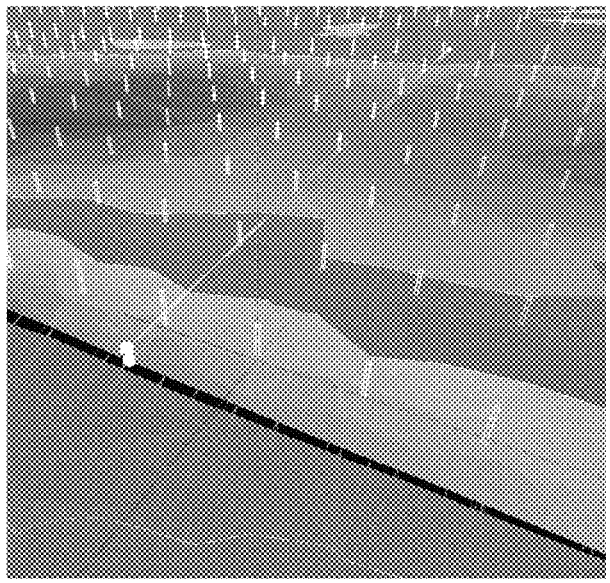
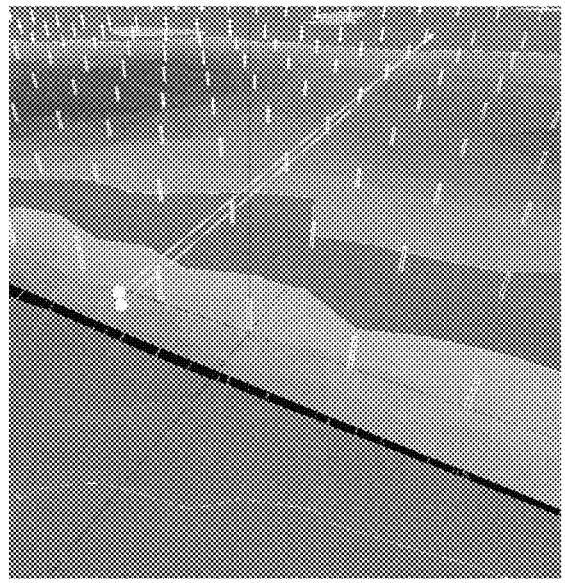
Fig. 19             Fig. 20
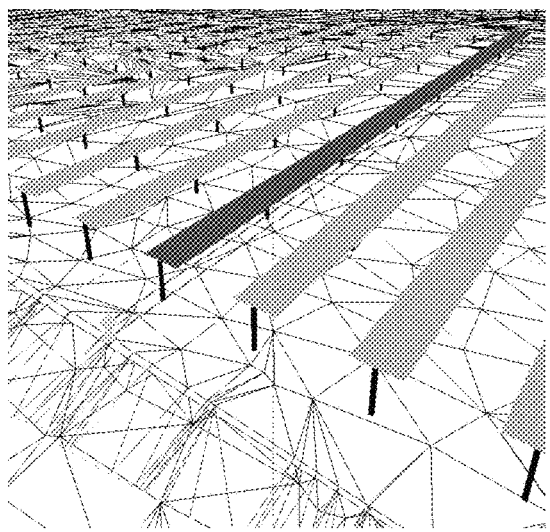
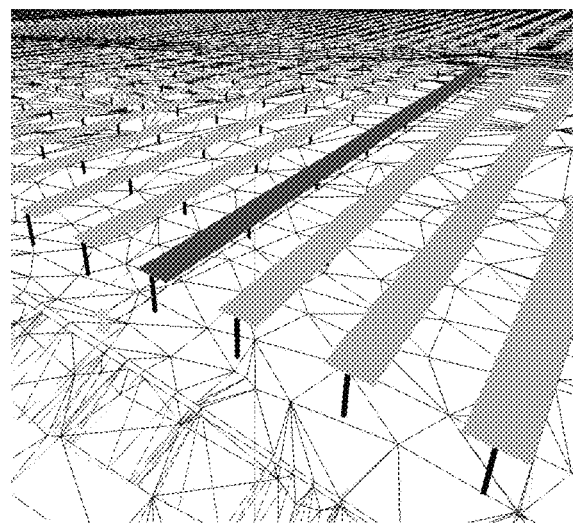
Fig. 19A            Fig. 20A

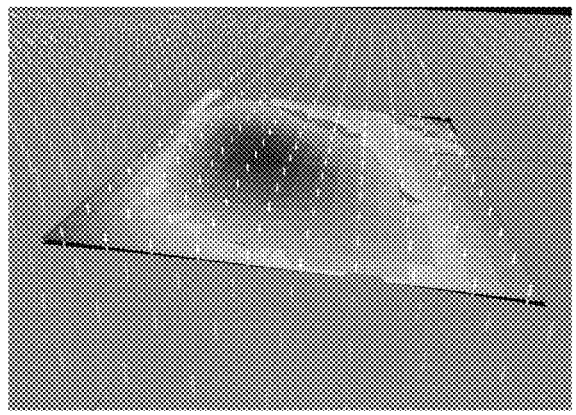
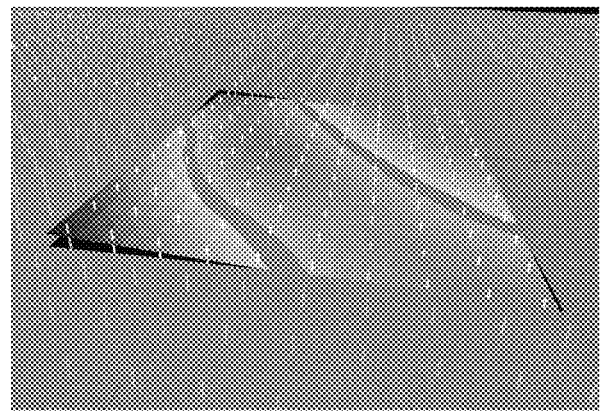
Fig. 23
Fig. 24
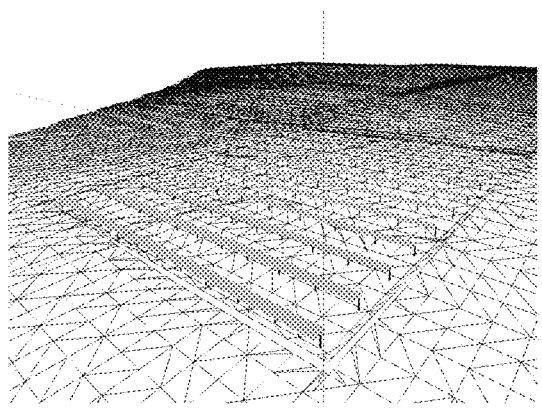
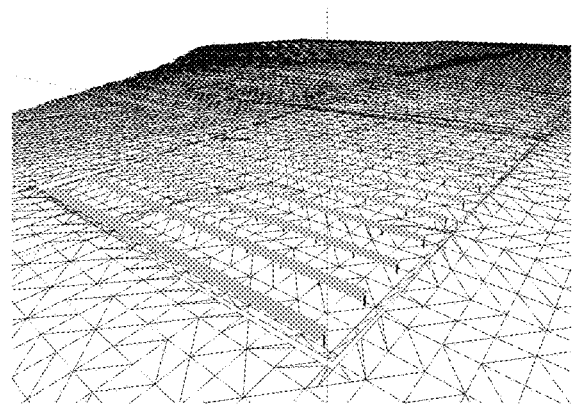
Fig. 23A
Fig. 24A

| Pile Id | Block # | Tracker # | Pile # | Type | Length | Section | X-Coord | Y-Coord | Zmin | Zcut | Zmax |
|---|---|---|---|---|---|---|---|---|---|---|---|
| 325 | 1 | 1 | 1 | EXTERIOR | 26.773 | W6x7 | 4355.01 | 8853.87 | 495.23 | 517.70 | 522.00 |
| 335 | 1 | 1 | 2 | EXTERIOR | 27.091 | W6x7 | 4355.01 | 8828.76 | 495.23 | 518.30 | 522.32 |
| 334 | 1 | 1 | 3 | EXTERIOR | 27.410 | W6x7 | 4355.01 | 8803.65 | 495.23 | 518.62 | 522.64 |
| 333 | 1 | 1 | 4 | EXTERIOR | 27.728 | W6x7 | 4355.01 | 8778.53 | 495.23 | 518.95 | 522.96 |
| 332 | 1 | 1 | 5 | EXTERIOR | 28.046 | W6x7 | 4355.01 | 8753.42 | 495.23 | 519.28 | 523.28 |
| 331 | 1 | 1 | 6 | MOTOR | 28.364 | W6x7 | 4355.01 | 8728.31 | 495.23 | 519.58 | 523.59 |
| 330 | 1 | 1 | 7 | EXTERIOR | 28.682 | W6x7 | 4355.01 | 8703.20 | 495.23 | 519.89 | 523.91 |
| 329 | 1 | 1 | 8 | EXTERIOR | 29.001 | W6x7 | 4355.01 | 8678.09 | 495.23 | 520.21 | 524.23 |
| 328 | 1 | 1 | 9 | EXTERIOR | 29.319 | W6x7 | 4355.01 | 8652.98 | 495.23 | 520.37 | 524.55 |
| 327 | 1 | 1 | 10 | EXTERIOR | 29.637 | W6x7 | 4355.01 | 8627.86 | 495.23 | 520.29 | 524.87 |
| 326 | 1 | 1 | 11 | EXTERIOR | 29.955 | W6x7 | 4355.01 | 8602.75 | 495.23 | 520.36 | 525.19 |
| 336 | 1 | 2 | 1 | EXTERIOR | 26.537 | W6x7 | 4338.66 | 8853.87 | 495.23 | 517.61 | 521.83 |
| 346 | 1 | 2 | 2 | EXTERIOR | 26.850 | W6x7 | 4338.66 | 8828.76 | 495.23 | 518.07 | 522.08 |
| 345 | 1 | 2 | 3 | EXTERIOR | 27.100 | W6x7 | 4338.66 | 8803.65 | 495.23 | 518.32 | 522.33 |
| 344 | 1 | 2 | 4 | EXTERIOR | 27.355 | W6x7 | 4338.66 | 8778.53 | 495.23 | 518.58 | 522.59 |
| 343 | 1 | 2 | 5 | EXTERIOR | 27.607 | W6x7 | 4338.66 | 8753.42 | 495.23 | 518.83 | 522.84 |
| 342 | 1 | 2 | 6 | MOTOR | 27.860 | W6x7 | 4338.66 | 8728.31 | 495.23 | 519.08 | 523.09 |
| 341 | 1 | 2 | 7 | EXTERIOR | 28.112 | W6x7 | 4338.66 | 8703.20 | 495.23 | 519.31 | 523.34 |
| 340 | 1 | 2 | 8 | EXTERIOR | 28.364 | W6x7 | 4338.66 | 8678.09 | 495.23 | 519.58 | 523.60 |
| 339 | 1 | 2 | 9 | EXTERIOR | 28.617 | W6x7 | 4338.66 | 8652.98 | 495.23 | 519.78 | 523.86 |

Objective solution found when β is such that the angle θ (i.e., between vectors $\vec{n}$ and $\vec{p}$) is minimum

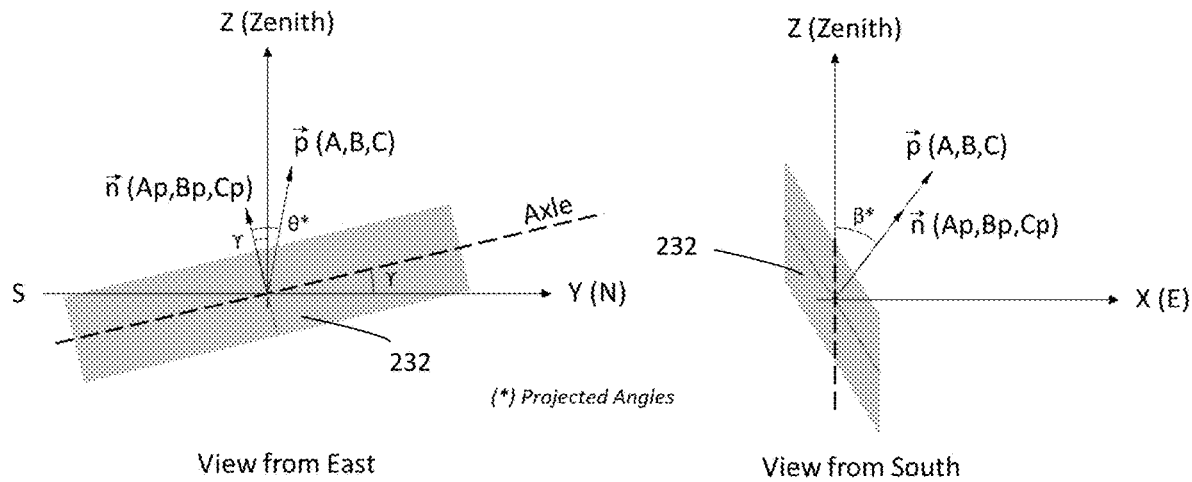
View from East
Fig. 40B
View from South
Fig. 40C
(*) Projected Angles
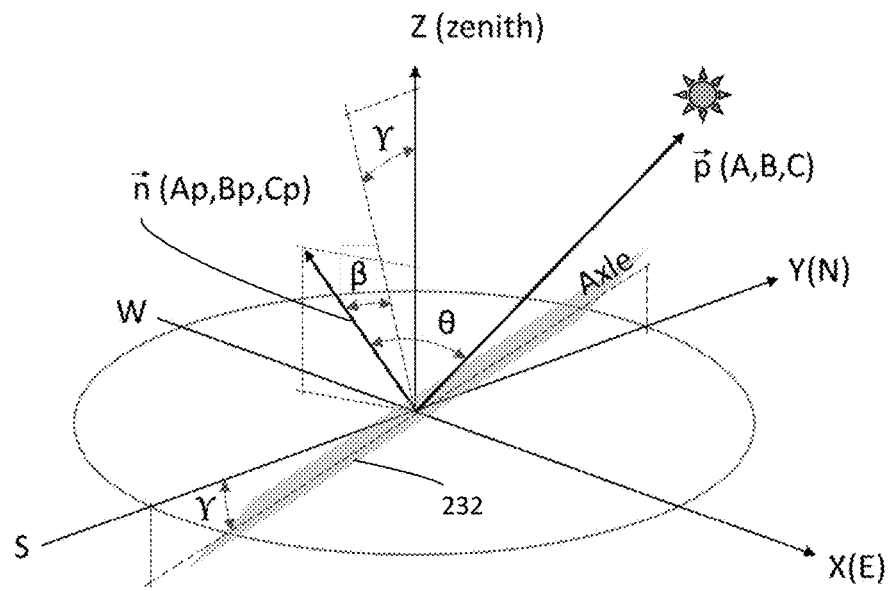
Initial Feasible State found when β is such that vector $\vec{p}$ is contained in the plane of the module
Fig. 40D

*A – All trackers following the sun position for maximum incidence angle (producing row-to-row mutual shadings)*

*B – All trackers rotated so to avoid all mutual shadings (limiting the energy production), per 'backtracking' strategy.*

COST-OPTIMIZATION AND ENERGY YIELD OPTIMIZATION DEVICE FOR UTILITY-SCALE PHOTOVOLTAIC POWER PLANTS

FIELD OF THE INVENTION

The present invention relates to cost-optimizing site grading and energy yield optimizing for utility-scale photovoltaic power plants.

BACKGROUND

Utility-scale solar photovoltaic power plants require mounting structures to which the solar modules are attached to. The mounting structures can be either fixed-tilt type or solar tracking type. In the second case, the tracking structures are mechanisms providing the solar modules with varying orientation to maximize the energy yield of the solar plant.

Among the different types of solar tracking structures, the most commonly used in the industry are the so called 'single axis trackers'. See, FIG. 1. These consist of a horizontal rotating axis mounting a multiplicity of modules. The north-south orientation and slow rotation of the horizontal axis adjusts the orientation of the solar modules as a function of the sun's position, so as to minimize the incident angle of the solar beams onto their surface. The horizontal rotating axis is supported by means of a series of vertical steel piles, transmitting the structural loads to the ground. The rotating axis and the vertical piles supporting it are mechanically connected by means of bearings on top of each pile.

Horizontal single-axis trackers inherently require small assembly tolerances to ensure the adequate alignment of its moving parts, which is achieved through the corresponding alignment for the bearings at the top of the piles.

If the terrain topography is not perfectly flat, the length of the piles can be designed to absorb terrain irregularities under each tracker, so to maintain the required alignment of the axis or axle. Alternatively, the terrain can be graded to smooth the topographic irregularities. It is straightforward that there is a trade-off between the terrain grading intensity and the length of the piles, therefore there is an optimum design point to be found which minimizes the overall cost of grading plus steel piles. In addition, there are project-specific geometric restrictions such as (i) minimum pile height to ensure sufficient gap between the modules and the ground when the tracker is deployed, (ii) maximum pile height to facilitate mechanical assembly by hand, (iii) maximum angular deviation from the horizontal line the tracker rotating axis is set to, (iv) maximum elevation difference between two parallel trackers (i.e. above which the exposed tracker would bear full wind loads).

There are infinite possible solutions for the combinations of the above variables, but only one optimal solution. Resolving this optimization problem is computationally intense, and manual solutions would be impractical due to extreme amounts of time required. What is needed is a set of algorithms to optimize the solution that can be run on a computer.

SUMMARY OF INVENTION

The subject of this invention is embodied in a cost-optimization device for the layout and construction of a utility-scale photovoltaic ("PV") power plant. The optimization device employs a set of algorithms designed to find the most cost-effective solution under given conditions. The algorithms are written in computer machine readable code and are highly customizable for the specific tracker equipment requirements and owner/builder/maintainer specifications or preferences.

The preferred optimization device comprises three principal stages (or "units") of computing: (1) an objective-state unit, (2) an optimum-feasible unit, and (3) a grading unit. In the first stage, the objective-state unit cost-optimizes site grading by orienting a ruling line between a maximum and a minimum pile reveal length for each tracker in the project (the objective-state solution"). When compared to the existing site topography, the ruling line indicates cost-optimized cut and fill locations.

In the second stage, the optimum-feasible unit modifies the objective-state solution to satisfy given geometric constraints of the project. More specifically, the optimum-feasible unit employs a project-wide mesh ("system mesh") to check whether the objective-state solution complies with the project's geometric restrictions. If not, the optimum-feasible unit applies a marching algorithm to incrementally adjust each ruling line until it finds a solution that minimizes site grading while complying with the project's geometric restrictions (the "optimum-feasible solution").

In the third stage, the grading unit modifies the optimum-feasible solution to satisfy non-geometric constraints of the project (the "final-state solution").

In addition, this invention is embodied in an energy yield optimization device that can be used to optimize energy yields for a utility-scale photovoltaic power plant. More specifically, this solution is directed to utility-scale photovoltaic power plants that have undulating (non-planar) topography. Because of the undulating topography, the rotating axles of the solar trackers will not necessarily be horizontal and would be expected to be different for each independent rotating axle in the field.

Optimizing energy yields for a utility-scale photovoltaic power plant comprising a plurality of non-planar single-axis trackers is elusive because (a) the field of single axis trackers can all have different three-dimensional axle orientations, (b) the relative position of the sun is constantly changing, and (c) "row-to-row shading."

Finding the optimum axle rotation angle $\beta$ for each axle in a non-planar utility-scale solar photovoltaic power plants for any time of day without permitting any row-to-row shading is extremely complex and cannot be done by hand. Nor can it be done as a practical matter by attempting to program a computer to directly compute the single optimum solution. The preferred solution claimed herein deploys a marching algorithm to find the preferred optimum solution.

BRIEF DESCRIPTION OF DRAWINGS

FIGS. 15 and 15A illustrate original terrain mesh.

FIGS. 16 and 16A illustrate proposed grading by reassignment of elevations for mesh nodes (optimized system mesh lines also depicted).

FIGS. 19 and 19A illustrate an initial grading solution and selected system mesh link shown (fill and cut lines depicted).

FIGS. 20 and 20A illustrate a manual adjustment of the system mesh node, pulled upwards.

FIGS. 23 and 23A illustrate a grading pattern of a single block as a hyperbolic paraboloid.

FIGS. 24 and 24A illustrate the same block from FIG. 21 graded as a plane. Note the better adaptability to the terrain in the first case (FIG. 21).

FIG. 40B illustrates a section view of FIG. 40A looking from the East.

FIG. 40C illustrates a section view of FIG. 40A looking from the South.

FIG. 40D illustrates an embodiment of the initial feasible state solution where sun position vector p is coincident with the plane containing the surface of the solar module 232. Stated another way, sun position vector p is perpendicular to the normal vector n emanating from the surface of the solar module 232.

FIG. 41A would be an example of an objective state solution where row-to-row shading occurs.

FIG. 41A would be an example of a feasible state solution, perhaps even an optimum feasible solution.

FIG. 42 would be an example of an initial feasible state solution where sun position vector $\vec{p}$ is coincident with the plane containing the surface of the solar module 232. Stated another way, sun position vector $\vec{p}$ is perpendicular to the normal vector $\vec{n}$ emanating from the surface of the solar module 232.

FIG. 41A would be an example of an objective state solution where row-to-row shading occurs.

OVERVIEW OF THE PREFERRED EMBODIMENT

Figure 1:
FIG. 1 illustrates a typical PV field with single axis trackers.
Figure 2:
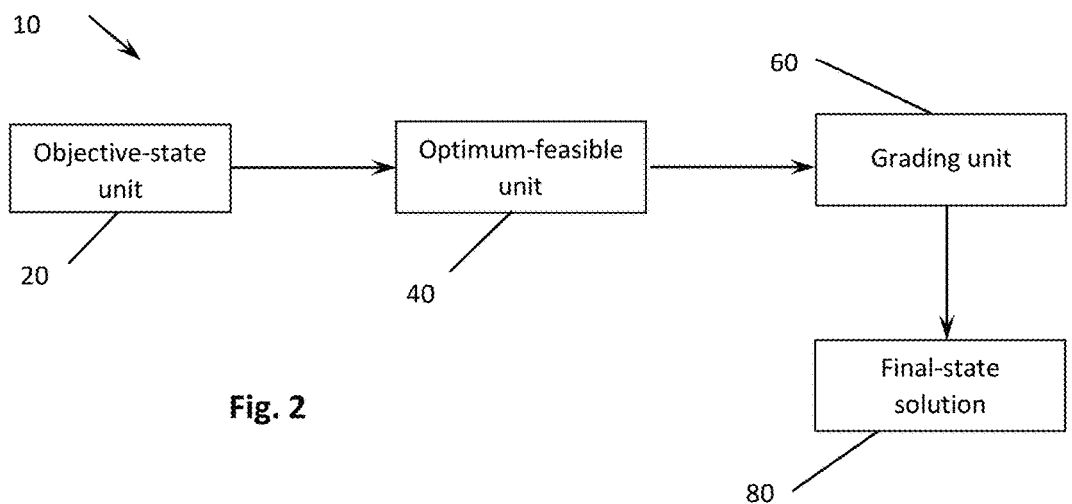
FIG. 2 illustrates a block diagram of the functional units of the optimization device 10.

A broad overview of the preferred optimization device 10 is shown in FIG. 2. The preferred device comprises three basic computing units to arrive at a final-state solution 80. First, an objective-state unit 20 calculates an objective-state solution. Next, after comparing the objective-state solution against the project's geometric constraints, an optimum-feasible unit 40 modifies the objective-state solution (if needed) to reach an optimum-feasible solution that satisfies the project's geometric constraints. Finally, a grading unit 60 modifies the optimum-feasible solution to satisfy any non-geometric project-specific constraints to arrive at the final-state solution 80.

Figure 3A:
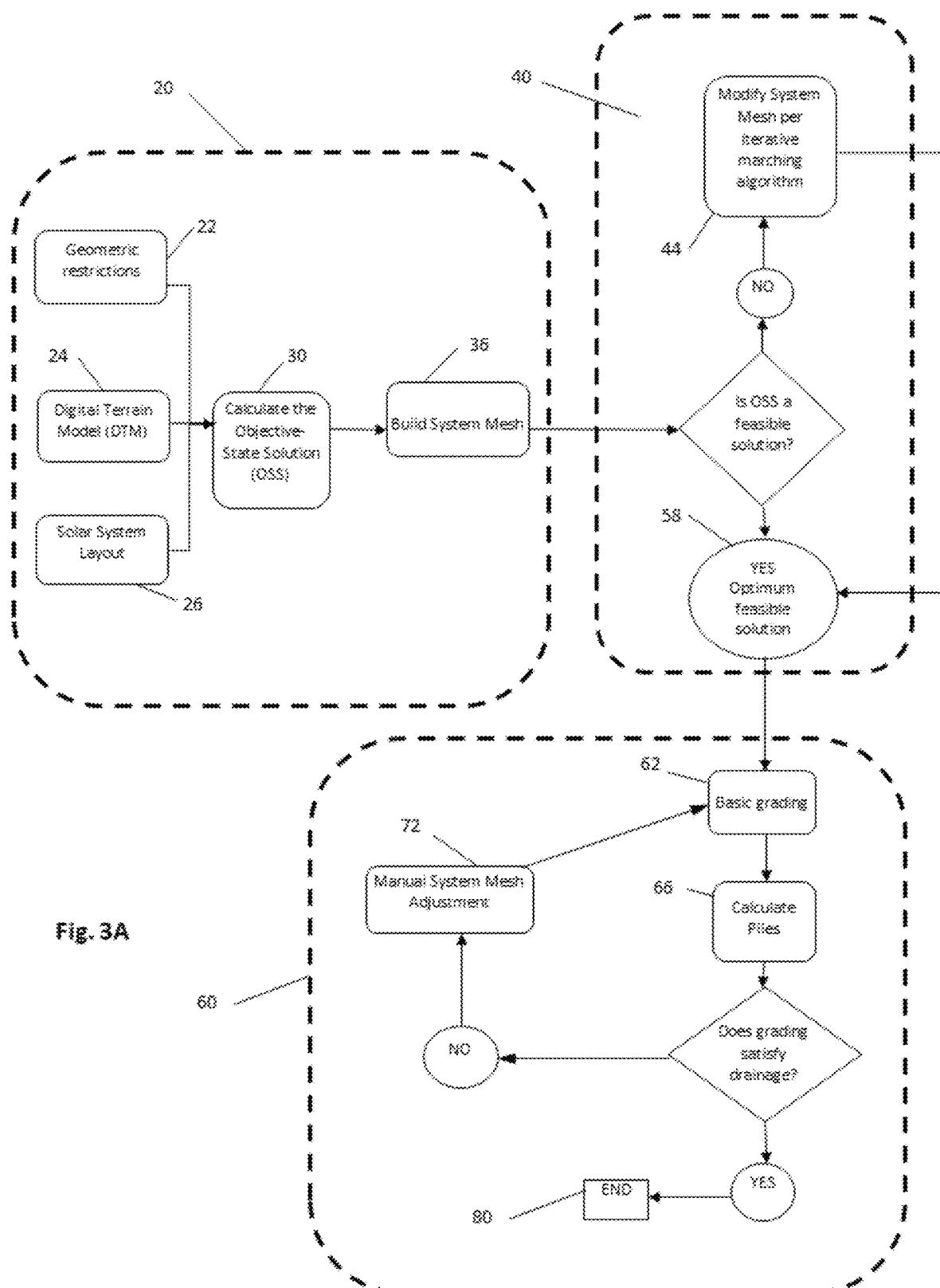
FIG. 3A illustrates a method for carrying out the optimization in a flowchart.

Next, the flowchart of FIG. 3A illustrates the preferred method for carrying out the invention. As shown, the first major step is performed by the objective state unit 20. The goal of the objective-state unit 20 is to calculate the objective-state solution 30. To accomplish this goal, the objective-state unit 20 should be configured to accept the following user input: geometric constraints 22, terrain data 24, and solar system layout 26. Using this input, the objective-state unit 20 can calculate the objective-state solution 30 as discussed in detail below. In addition, this input can be used to build a system mesh 36.

The next major step is performed by the optimum-feasible unit 40. The goal of the optimum-feasible unit 40 is to calculate the optimum-feasible solution state 58. To accomplish this goal, the optimum-feasible unit 40 begins with the objective-state solution 30. If the objective-state solution 30 is not a feasible solution (that is, the geometric restrictions fail), then the optimum-feasible unit 40 applies the marching algorithm 44 to modify the system mesh 36 an incremental amount toward a feasible solution 58. The optimum-feasible unit 40 repeats the marching algorithm 44 until a solution is found that both minimizes site grading and complies with the project's geometric restrictions 22 (the optimum feasible solution 58).

Once the optimum feasible solution 58 has been achieved, the grading unit 60 can modify the system mesh 36 until the final state solution 80 is found. The goal of the grading unit 60 is to translate the optimum feasible state system mesh 36 to a buildable grading design through alteration of the Digital Terrain Model 24 and pile design, per the basic grading algorithm 62. This process may require further changes in the optimum feasible solution 58 to satisfy other project-specific related constraints. FIG. 3A outlines the basic steps of the grading unit 60.

Figure 3B:
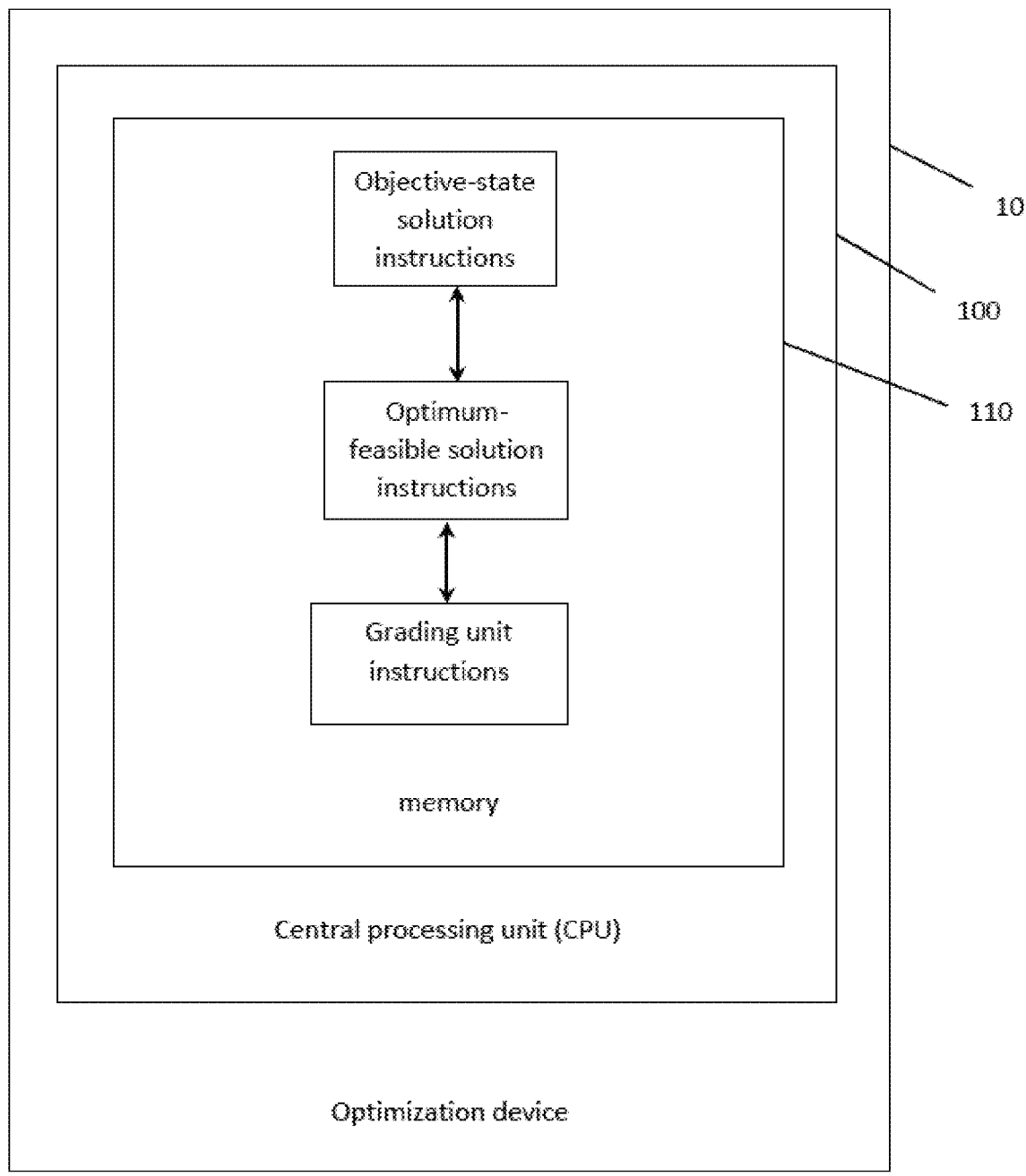
FIG. 3B illustrates a hardware description of the optimization device 10.

Next, a hardware description of the preferred optimization device 10 according to exemplary embodiments is described with reference to FIG. 3B. In FIG. 3B, the optimization device 10 includes a CPU 100 which performs the processes described below. A CPU 100 provides the processor for the objective-state unit 20, the optimum-feasible unit 40, and the grading unit 60 shown in FIG. 2. The CPU 100 includes a memory 110 in which process data and software instructions are stored. The data and instructions may also be stored on a separate storage medium disk such as a hard drive (HDD) or portable storage medium or may be stored remotely. The invention is not limited by the form of computer readable media on which the instructions are stored. For example, the instructions may be stored on CDs, DVDs, in FLASH memory, RAM, ROM, PROM, EPROM, EEPROM, hard disk or any other optimization device with which the CPU 100 can communicate, such as a server or computer.

Further, the claimed processing may be provided as a utility application, background daemon, or component of an operating system, or combination thereof, executing in conjunction with CPU 100 and an operating system such as Microsoft Windows 10, UNIX, Solaris, LINUX, Apple MAC-OS and other systems known to those skilled in the art. The hardware elements used for the information processing functions may be realized by various processing circuitry elements, known to those skilled in the art. For example, CPU 100 may be a Core processor from Intel or a processor from AMD, or may be other processor types that would be recognized by one of ordinary skill in the art. Alternatively, the CPU 100 may be implemented on an FPGA, ASIC, PLD or using discrete logic circuits, as one of ordinary skill in the art would recognize. Further, CPU 100 may be implemented as multiple processors cooperatively working in parallel to perform the instructions of the process described above.

The software instructions or algorithms for carrying out the process of cost optimization in accordance with this invention are described in detail below. The instructions are preferably in the form of software stored in the memory 110 that control the CPU 100 to perform the functions of calculating an objective-state solution 30, an optimum feasible solution 58, including a grading plan for minimizing earthwork under a plurality of tracker piles, and calculating a final-state solution 80, which is an adjusted objective-state solution that accounts for project-specific limitations. The hardware description above, exemplified by the structure example shown in FIG. 2, constitutes structure that is programmed or configured to perform the algorithms described below, which may be completely performed by the circuitry included in the single device shown in FIGS. 2 and 3B.

Description of Preferred Computing Units and Algorithms
Objective-State Unit 20
1.1 Inputting Project Conditions and Restrictions Minimizing site grading is key to controlling solar system project cost. Grading is often needed to adapt the terrain irregularities to the geometric restrictions and mechanical tolerances of the trackers. Minimum grading design seeks to limit site topography alterations while still complying with a project's geometric tracker restrictions 22 for a given solar system layout 26.

Turning to FIG. 3A, the optimization device 10 begins with data input of geometric restrictions (and mechanical tolerances) 22 of the single-axis trackers, a digital terrain model (DTM) 24 of the project site, and the solar system layout 26.

Site topography can be analyzed per two different length scales. Small scale terrain irregularities (or 'terrain roughness') are those with a characteristic length smaller than the tracker length. Large scale terrain irregularities (or 'terrain orography') are topographic irregularities with a characteristic length scale larger than the tracker length. In general, terrain roughness irregularities can be absorbed by the difference between the imposed maximum and minimum tracker torque tube height (TTH); i.e., the variation range the reveal length of the tracker foundation piles are given by design. This interval is defined as delta ($\delta$) (see FIG. 7).

$$\delta = [TTH]\_max - [TTH]\_min$$

If for a certain tracker the terrain roughness scale is smaller than ($\delta$), no grading would be needed under that tracker to locally smooth the terrain roughness. In practice, TTHmin is limited by the minimum clearance between ground and module frame when the tracker is fully deployed, and TTHmax is limited for project constructability reasons.

More relevant in evaluating the grading intensity is the large-scale terrain orography. The limits for which a certain terrain orography requires grading are given by the angular limitations the trackers are subjected to. These are (i) the maximum North-South tilt angle the torque tube is allowed, and (ii) the maximum East-West drop angle between two adjacent trackers. The first restriction accounts for the fact that North-tilted trackers yield less energy than South-tilted ones because of less-optimal exposure to solar beams (in the northern hemisphere). The second restriction accounts for the fact that excessive difference in the vertical elevation of two adjacent trackers would expose the higher tracker to full wind loads, thus increasing the structural costs. It also increases the mutual shading between solar modules mounted on adjacent trackers during operation, thus also impacting energy yield.

A third geometric control parameter is the maximum transversal slope of the East-West corridors between tracker alignments. In some instances, these corridors are designed as internal roads for construction and O&M purposes. The slope limitations for the transversal section of these corridors have an essential role in grading design as they entail the conditions for geometric continuity of the full system.

In summary, the geometric restrictions 22 defining the grading design parameters are the following:
- Delta ($\delta$) parameter, from foundation piles.
- North-South maximum tracker torque tube tilt angle ($\alpha$).
- East-West maximum drop angle between adjacent trackers ($\beta$).
- Transversal slope limitations for East-West corridors between tracker alignments ($\gamma$).

For any given topography 24 and tracker layout 26, there are infinite grading solutions which satisfy a given set of geometric restrictions 22. A trivial solution would grade the full site as a single horizontal plane. By creating and leveraging "ruled surfaces", grading intensity can be greatly minimized. Finding the minimum grading solution for a given set of restrictions is a computationally intense process which can only be resolved by means of numerical methods and 3D simulation techniques.

Figure 4:
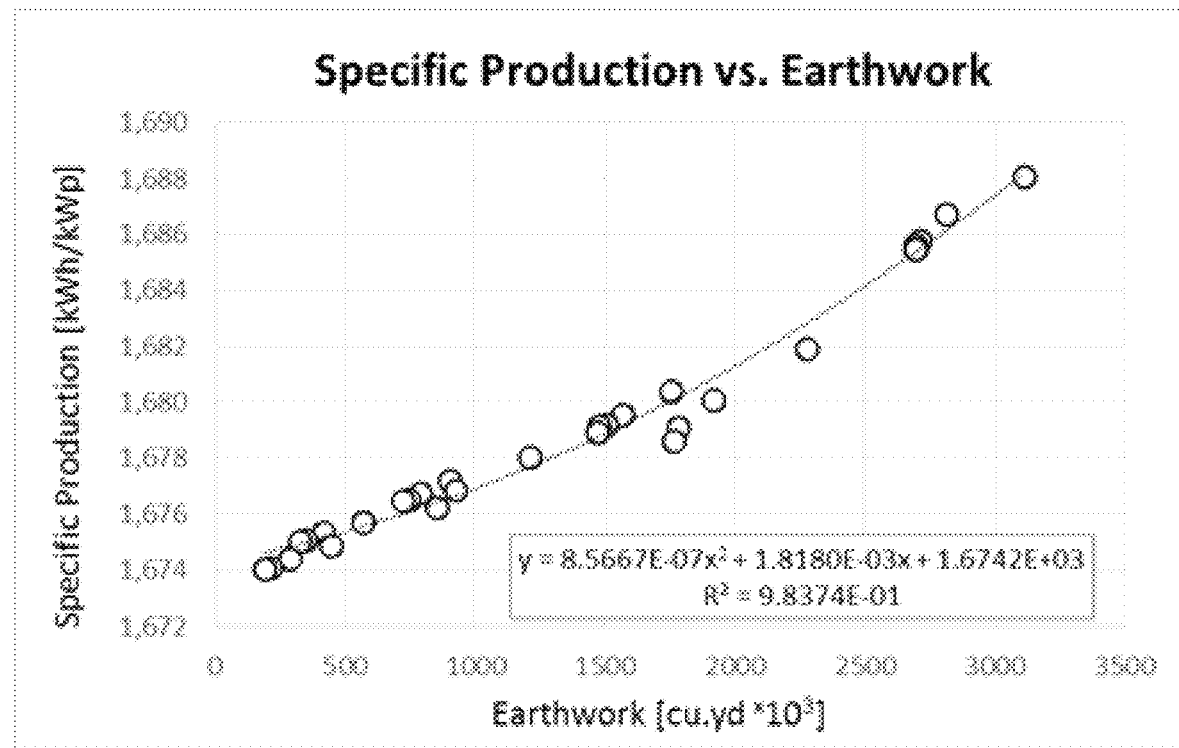
FIG. 4 illustrates a sample correlation graph between energy yield and grading intensity.

Alternatively, releasing the system restrictions and allowing for longer tracker foundation piles can also facilitate the solar system geometric adaptation to the existing terrain, thus reducing grading intensity. The trade-offs are reducing energy production and increasing steel foundation costs. When analyzing the most optimal design for a solar system, the Levelized Cost of Energy (LCOE) financial function is evaluated for its minimum value. This function is defined as the ratio between the life-cycle system cost and the corresponding energy yield, which are both function of the selected system geometric restrictions. Moreover, for each solar system there is a direct correlation between energy yield and grading intensity. Finding this correlation for is instrumental to find the most financially optimal design for the system. A sample correlation graph between energy yield and grading intensity is shown in FIG. 4.

1.2 Calculating the Objective-State Solution 30

Figure 5:
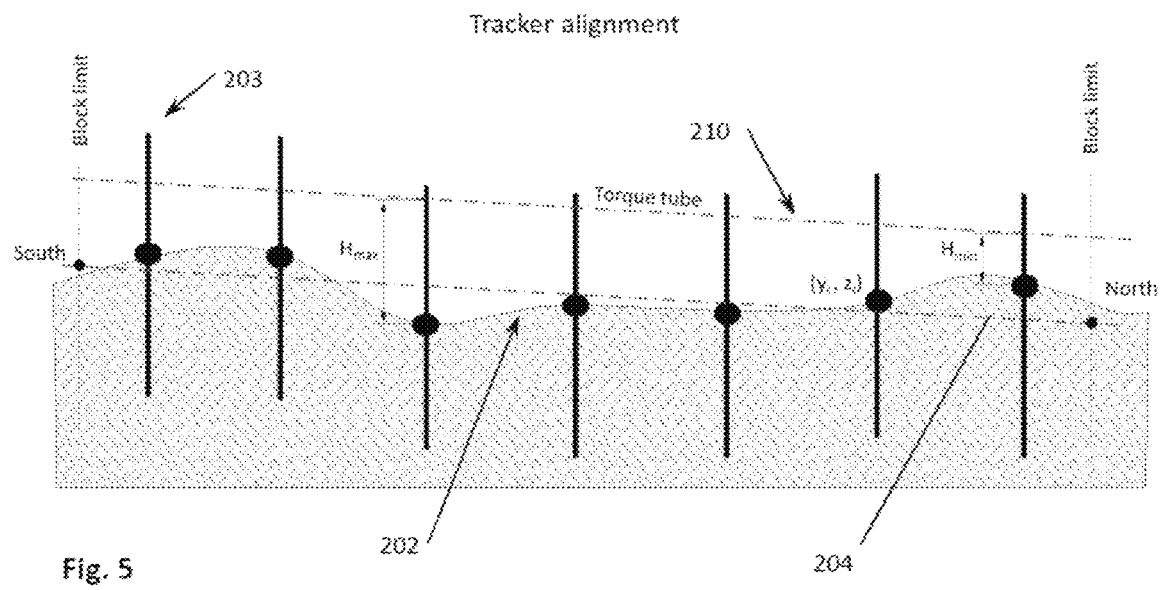
FIG. 5 illustrates the least square ruling line adjustment for tracker piles.

Turning to FIG. 5, the minimum amount of earthwork under a tracker is found when the terrain 202 is graded to a theoretical straight line obtained by least squares adjustment to the points where the tracker piles 203 intersect the existing terrain 202. These are termed "ruling lines" 204. FIG. 5 illustrates the piles' alignment belonging to one tracker, the corresponding pile-terrain intersection points, and the ruling line 204 obtained through least-square fitting to these points. The ruling line for a tracker is contained in the vertical plane defined by the corresponding tracker's piles 203. This vertical plane is generally oriented in North-South direction, and also contains the tracker rotating axle (or torque tube 210).

Figure 6:
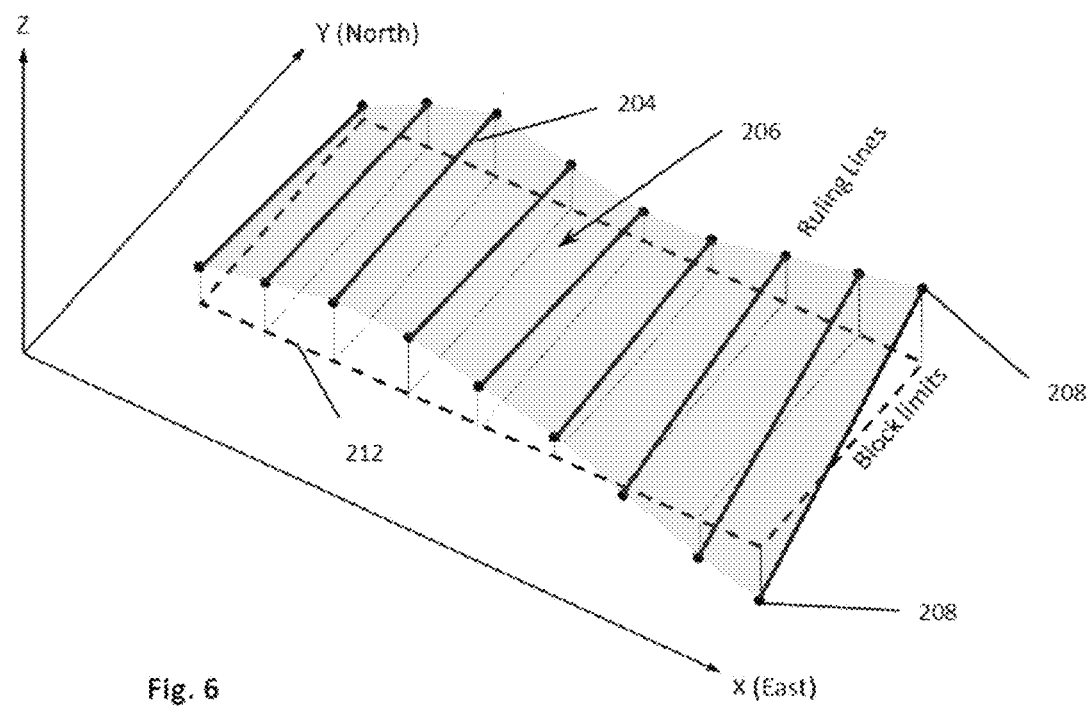
FIG. 6 illustrates a ruled surface built by grouping of independent ruling lines.

As the terrain under each tracker has different orientations, the slopes and elevations of the several ruling lines 204 vary from tracker to tracker. When grouping a series of ruling lines, the geometric figure thus obtained is a three-dimensional ruled surface 206, as shown in FIG. 6.

A group of aligned trackers is called a "block" 212. This is defined as a parallelogram containing all the aligned trackers which ruling lines can form a ruled surface 206. Blocks 212 are considered grading units, so that grading parameters, geotechnical properties, pile geometry restrictions and all other design parameters are assigned to be identical for all the trackers within a block 212. Each ruler line 204 intersects the boundary of the block it belongs to at two points 208, located at its North and South ends respectively (see FIG. 6). By altering the elevation of these two endpoints 208, the ruler line slope and vertical position would be changed and thus the corresponding grading departing from optimal.

Figure 7:
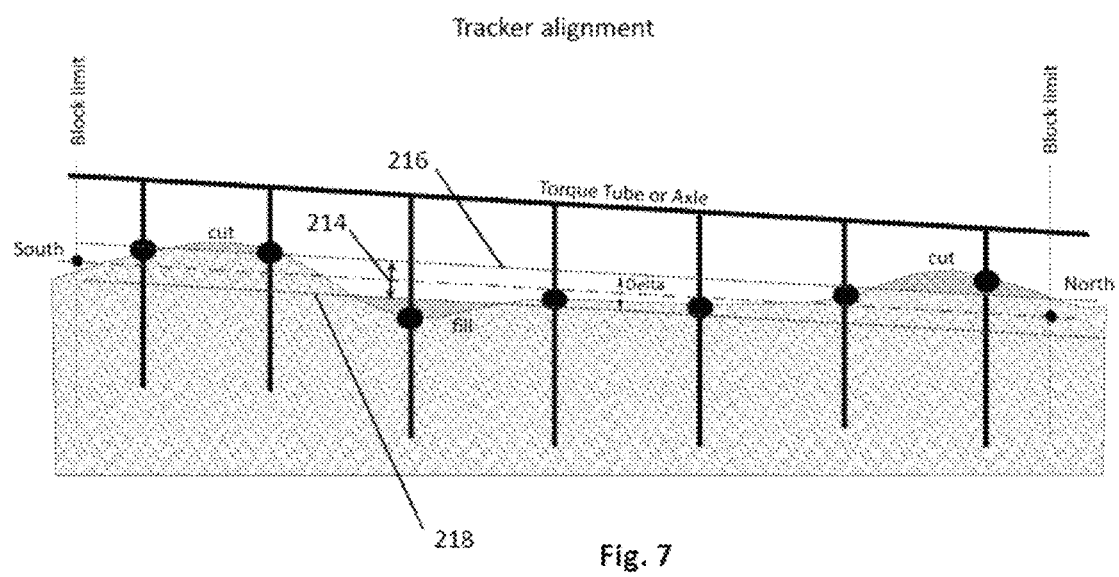
FIG. 7 illustrates a definition of grading lines and tracker axis orientation parallel to the ruling line.

A relevant parameter to control grading intensity is given by the difference between the minimum and maximum reveal length allowed for the piles. This difference is called the "delta" 214, which limits the maximum scale of the terrain irregularities that the reveal lengths of the piles are able to absorb before requiring local grading. This "delta" value can be superimposed to the ruling line for every tracker by means of two parallel lines, called the "fill" (lower) and the "cut" (upper) lines (216, 218), as shown in FIG. 7. The minimum grading strategy which satisfies the "delta" condition for the piles then becomes cutting the terrain over the upper line (space below "cut" in FIG. 7) and filling the voids under the lower line (space above "fill" in FIG. 7). The tracker rotating axis 210 should be kept parallel to the ruling line 204.

By performing a site grading per the above procedure the minimum grading volume for a solar photovoltaic plant which is also compatible with the "delta" value for the piles would be achieved. Once the grading design is completed, the tracker rotating axis elevation is readjusted and the final reveal length of each of the piles determined. By changing the "delta" requirement for the piles both the pile lengths and grading intensity vary inversely, thus the combined cost can be determined and plotted against the corresponding "delta".

The cost vs. delta graph can be used to find its minimum as the optimal design point for the Block. This minimum cost solution is essential in the full design optimization process, and is defined as the "Objective State" 30. Any deviation from this Objective State 30 implies additional grading volumes for a given "delta".

1.3—Building the System Mesh 36

The objective-state solution 30 described above doesn't account for additional geometric restrictions 22 which are relevant for practical design. These are:
- Maximum North facing tilt angle for tracker rotating axis: Imposed by tracker manufacturer, limit energy yield loss and/or surface water flow velocity limitations (scour).
- Maximum South facing tilt angle for tracker rotating axis: Imposed by tracker manufacturer and/or surface water flow velocity limitations (scour).
- Maximum East-West elevation difference between adjacent trackers: Imposed by tracker manufacturer based on shielding limitation for wind loads, energy yield loss due to mutual shading and/or surface water flow velocity limitations (scour).
- Maximum slope of the terrain between blocks: Imposed by grading requirements for internal O&M roads and/or surface water flow velocity limitations (scour).

Figure 8:
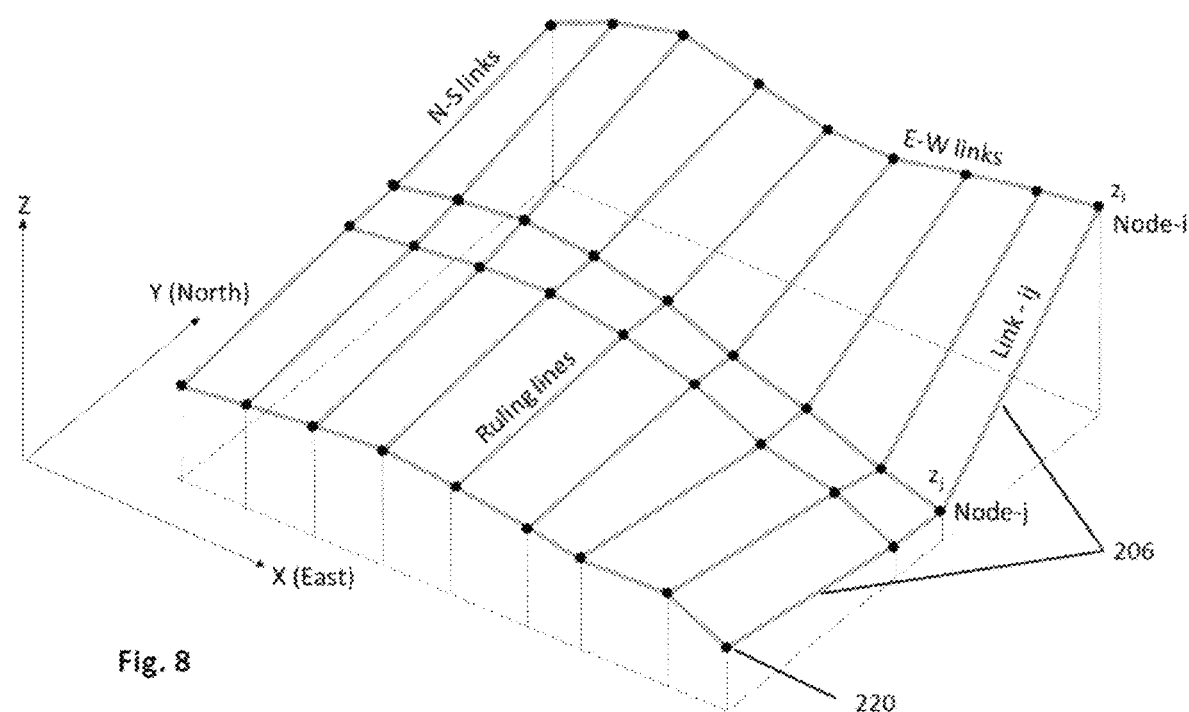
FIG. 8 illustrates topology of the system mesh 36.

In order to implement these restrictions, it is convenient to describe the geometry of the full photovoltaic system as a set of nodes 220 in the space, located at the end-points of the ruling lines. A series of virtual elements are defined connecting pairs of nodes. These elements are called "links". Each ruler line is a link by itself, but additional ones are defined as needed to capture the full set of restrictions. For instance, connecting nodes belonging two adjacent Blocks to control the slope of the terrain between them. A graphical representation of the nodes and links (system mesh topology 36) is shown in FIG. 8.

Each node in the system is defined by an ordinal and the link connecting a pair of them ($N_i$ and $N_j$) is identified with both subscripts ($L_{ij}$). The relevant variable at each node is its topographical elevation, so that node $N_i$ has an elevation value of $z_i$. The relevant variable for each link is its slope ($\alpha_{ij}$), which can be quantified as the difference in elevation of its assigned nodes divided by the link's length:

$$\alpha_{ij} = \frac{z_i - z_j}{L_{ij}}$$

The system mesh topology 36 is fully defined when the elevation of each node in the system mesh is set. Assuming that the system has N-nodes, it is convenient to describe the "state" of the system as an N-dimensional array s which coordinates are the topographical elevations of the sorted nodes:

$$s^t = (z_1, z_2, z_3, \ldots z_i, \ldots z_j, \ldots z_N)$$

Similarly, the restrictions can be written for the links as an M-dimensional array b, being M the total number of slope restrictions. The components of b consist of the slope limitations for the affected link times its length:

$$b_p = \alpha_p L_p$$

where $\alpha_p$ is the maximum slope allowed for the link p. Each link may have more than one restriction, as is the case of the ruling lines which are constrained by both the North and the South facing slopes. It is possible to rewrite the set of restrictions as a M×N system of inequalities As≤b, where A represents the connectivity matrix between links and nodes. This system of inequalities is the mathematical formulation for the system constraints.

The "Objective-state solution" 38 obtained through the basic algorithm is just one point in the N-dimensional space. This point is called $s^{obj}$, which is the minimum grading cost for the system but it doesn't in general fulfill all of the slope restrictions for its links. It is therefore an unfeasible solution for the optimization problem. This can assertion be written as:

$$As^{obj} \nleq b$$

In the N-dimensional space, the square of the distance between a feasible state s and the objective state $s^{obj}$ is evaluated with the function:

$$f(s) = |s - s^{obj}|^2 = \sum_{i=1}^{N}(z_i - z_i^{obj})^2$$

The Optimal Feasible Solution 58 is the set of node elevations s which minimize $f(s)$ and simultaneously satisfies the set of restrictions As≤b. Because the function $f(s)$ is quadratic, this optimization problem falls within the classical Constrained Quadratic Optimization category. Finding the exact solution to this complex problem is extremely costly in terms of both computer RAM requirements and time. Optimization device 10 employs a specific iterative marching algorithm which is not proven to provide the exact optimal solution (in mathematical terms), but still yields a sufficiently accurate optimal engineering solution.

Optimum-Feasible Unit 40

1.4 Applying an Iterative Marching Algorithm 44

The proposed iterative marching algorithm 44 starts with an initial feasible state $s^{ini}$. The next state in the iteration is obtained by applying the Newton's method to seek the minimum value of the function $f(s)$, which measures the distance between the current state and the objective state $s^{obj}$. This yields the following result:

$$s_{k+1} = s_k + \epsilon \frac{(s^{obj} - s_k)}{|s^{obj} - s_k|}$$

where (k) is the iteration step and where the marching parameter ($\epsilon$) is a sufficiently small number. The following state (k+1) is obtained by displacing the previous one (k) in a small amount towards the direction of the objective-state solution. With the new state $s_{k+1}$ computed, the slopes for all links are calculated to verify if all of them satisfy the system constrains:

$$As_{k+1} \leq b$$

In affirmative case, a new state (k+2) will be computed per the same rule. The new state will invariably be closer to the objective state and therefore a better solution than the previous iteration. If the new state $s_{k+1}$ doesn't fulfill the set of constraints, the nodes of those links violating their maximum slope will be incremented in the same amount in future steps, so to keep the slope of that link unchanged in further iterations.

Figure 9:
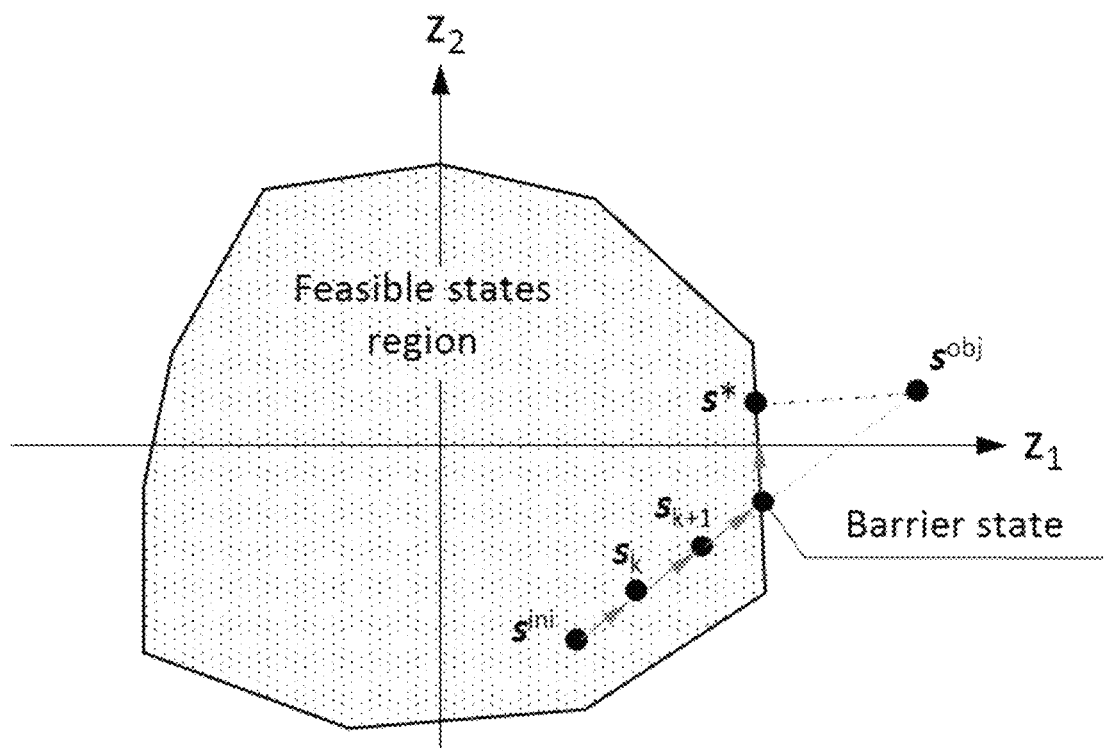
FIG. 9 illustrates the iterative marching algorithm 44 with barriers.
Figure 10:
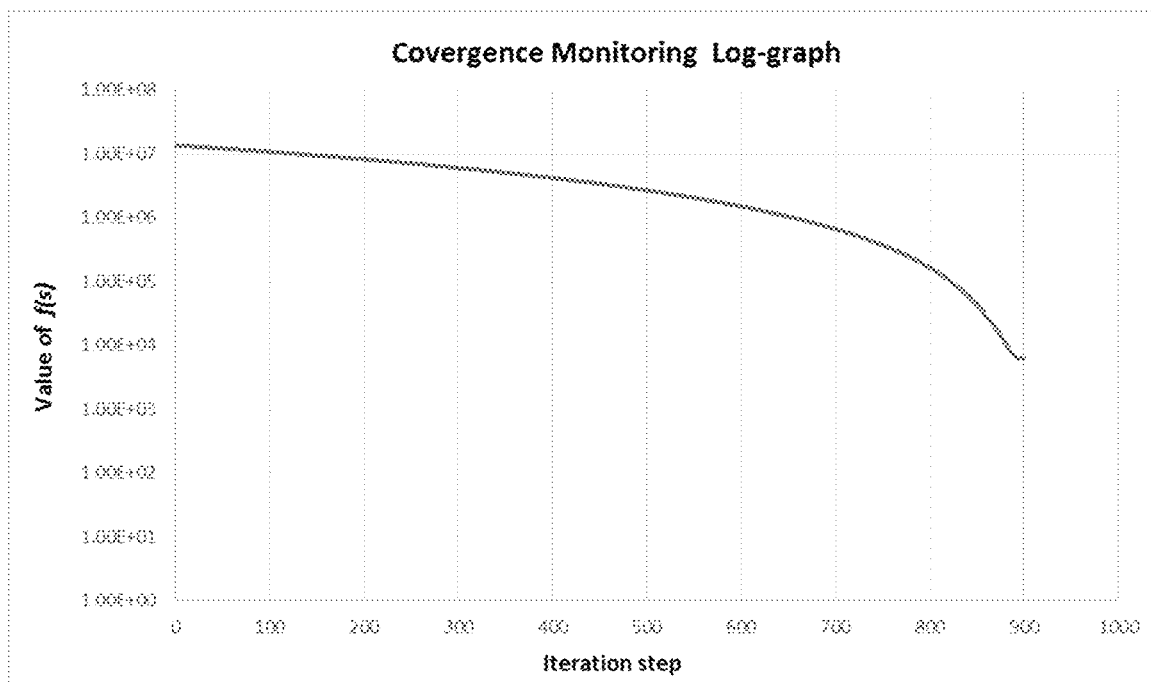
FIG. 10 illustrates a way to monitor convergence.

The process can be explained graphically in the N-dimensional space. FIG. 9 shows a 2-dimensional space consisting of the topographic elevation coordinates of two nodes $z_1$ and $z_2$. The objective state 38 is defined by the point $s^{obj}$ in the graph.

The initial state $s^{ini}$ is located within the Feasible states region. The (unknown) feasible optimal solution is denoted by s* (38), and is the one state within the feasible region which is closer to the objective state.

Per this iterative algorithm, if the actual state $s_k$ is in the feasible region, the new state $s_{k+1}$ is determined by approaching one step forward towards the objective state through a straight line connecting the initial and the objective states. As soon as one or more constrains are violated, meaning that the feasible region limit has been reached at a barrier state, a new marching path is automatically set for the following iteration step. The new path is determined by maintaining the slope of the affected link at its limit, therefore the new path necessarily overlaps the feasible region border, and the next iteration step will yield a new state closer to s* and contained in the border of the feasibility region.

$$s^{obj} = (z_1^{obj}, z_2^{obj})$$

While it is not guaranteed that this marching algorithm will hit the feasible optimal solution s*, it is straight forward to monitor the value of the function $f(s)$ as the marching solution progresses and determine if/when convergence is achieved. See, FIG. 9.

To define the initial feasible state $s^{ini}$ a trivial option is selected by assuming the same value for the topographic elevation for all nodes, that is $z_1 = z_2 = z_3 = \ldots = z_N = z_{min}$. If all nodes lie on the same plane, the slope of all the links would be zero, which guarantees that $As^{ini} \leq b$. In practice, $z_{min}$ is selected as the minimum elevation of all nodes in the objective state. For the marching parameter ($\varepsilon$) a maximum value of 1.2 inches is selected. This is more restrictive than standard grading accuracy or tolerances during construction of the plant.

Figure 11:
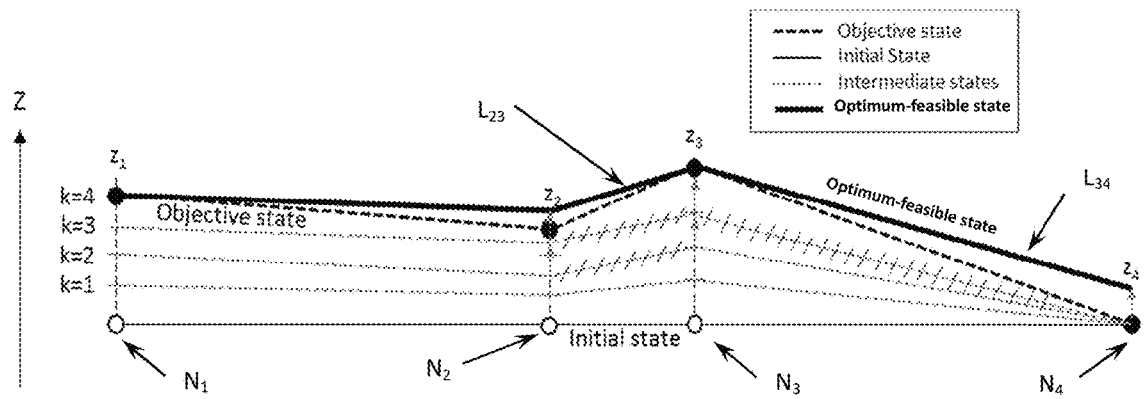
FIG. 11 illustrates an example of an iterative marching algorithm.
Figure 12:
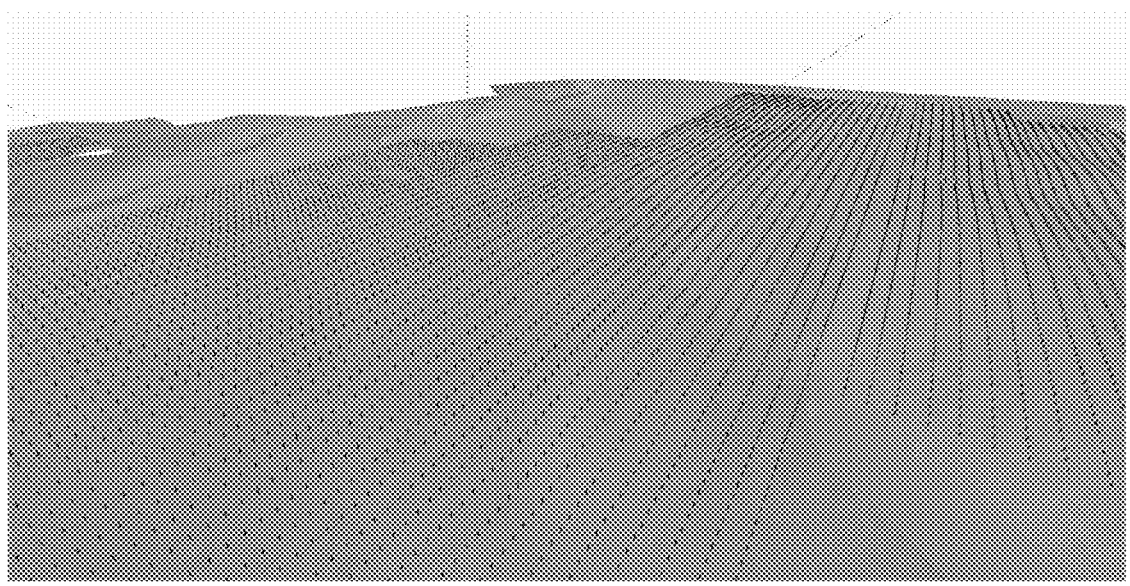
FIG. 12 illustrates a typical ruled surface grading and piles example (from optimization device 10).

FIG. 11 shows how the marching iterative algorithm works for a simple case. In the example in FIG. 11, the distance between a node in the objective state and its corresponding node in the initial state is divided into equal marching steps, being the maximum step across all nodes smaller than 1.2 inches. The marching steps are different for each node to match the same number of divisions (four in this example).

In the first iteration k=1, all initial state nodes are pulled up in one corresponding step and then slopes for links verified for their respective limits. After this first iteration, the new state is still feasible.

The same process is repeated in iteration k=2, but after the marching steps are applied the slope of link $L_{23}$ is found larger than its maximum limit. To avoid the slope of link $L_{23}$ growing further in future iterations, the marching step for node $N_2$ is set equal to the marching step of node $N_3$ in order to keep the slope of $L_{23}$ constant from k=1 onward.

After iteration k=3, the slope of link $L_{34}$ becomes larger than its limit, therefore the marching step for node $N_4$ is set equal to the marching step of node $N_3$ for further iterations.

After iteration k=4 the marching algorithm is completed with final position depicted in solid line.

Per this implementation, the optimum-feasible state could result in links with slopes in excess of its limits. However, by limiting the maximum step size to 1.2 inches the optimum-feasible state is well within the construction tolerances and the solution deemed acceptable for engineering purposes.

As a refinement, the optimum-feasible state can be slightly improved by shifting all nodes upwards or downwards in the same amount so to further reduce the value of the function $f(s)$. This additional general shift is found by least square techniques with respect to the objective state, which yields the following correction:

$$\theta = \frac{\sum_N z_i^{obj} - \sum_N z_i^{final}}{N}$$

The node elevations from the optimized state are transferred to the ruling lines and the terrain grading design completed for the applied "delta". Details on the grading process and associated functions are explained in paragraph 1.5.

Grading Unit 60

1.5—Basic Grading Algorithm 62

Figure 14:
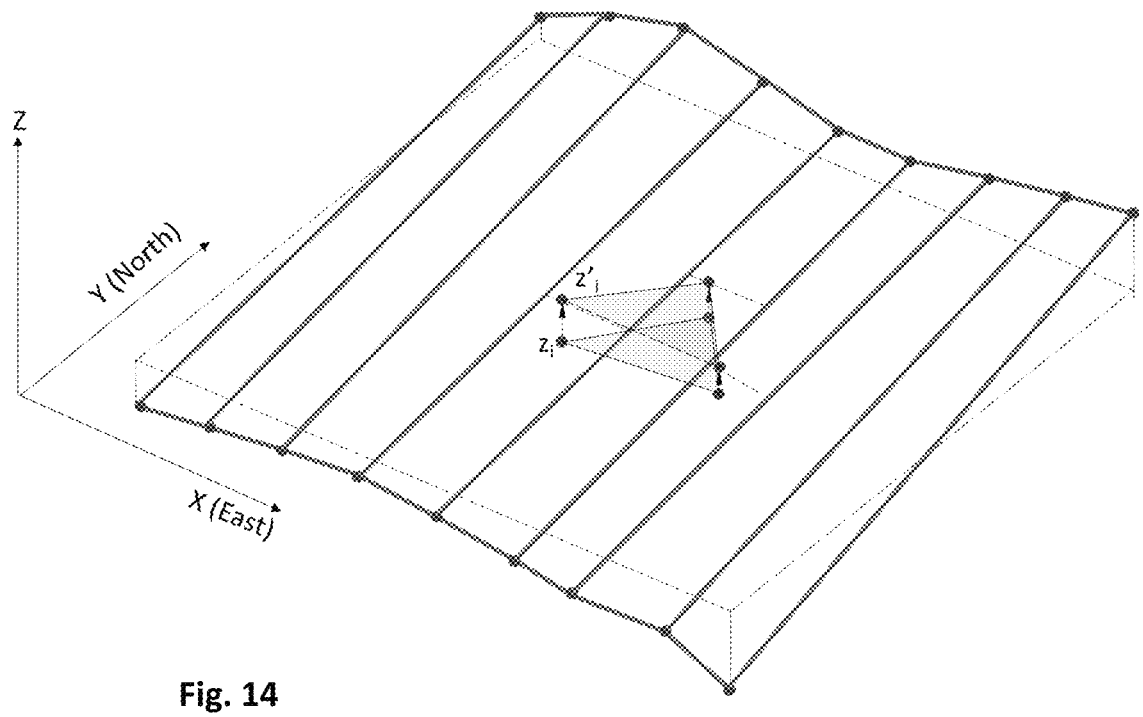
FIG. 14 illustrates the nodes of a triangle in the original DTM are pushed up or down to find their new topographical elevations, per bi-linear interpolation of the adjacent ruler lines.

Once the system mesh 36 has been iterated towards the feasible optimal solution 58 (s*), the existing digital terrain model (DTM) 24 is modified to the new proposed geometry (proposed grading solution). This is achieved by correcting the topographical elevations of the nodes in the triangular mesh of the original DTM 24. Because the (x,y) coordinates of the DTM nodes doesn't in general align with the system mesh elements, an interpolation algorithm is needed. A bi-linear (two dimensional) interpolation method is selected, so that a node which falls in between two consecutive ruler lines adopts a new elevation obtained through linear interpolation of the points belonging to the ruler lines and with the same y-coordinate. This is represented in FIGS. 14-16.

If the topographical elevation of the node in the existing terrain mesh falls within the "fill" and "cut" lines (216, 218), no change in elevation is imposed to that node. Therefore, the larger the distance between the parallel "cut" and "fill" lines (i.e., the "delta") the lower the number of nodes in the terrain mesh that would need to be modified, and thus the intensity of the proposed grading.

1.6—Parametric Model for Pile Sizing

Foundations for tracker structures consist of steel piles directly driven into the terrain. In Optimization device 10, the reveal (exposed) length of the driven pile is limited by the maximum and minimum torque tube height design parameters for the Block. Both the steel section and embedded length of each pile depend on the loads and soil geotechnical characteristics. The soil-pile interaction has highly non-linear behavior and iterative calculations are needed for determination of stress level and deflections. These calculations are represented in the flow chart of FIG. 3A as calculate piles 66.

Figure 13:
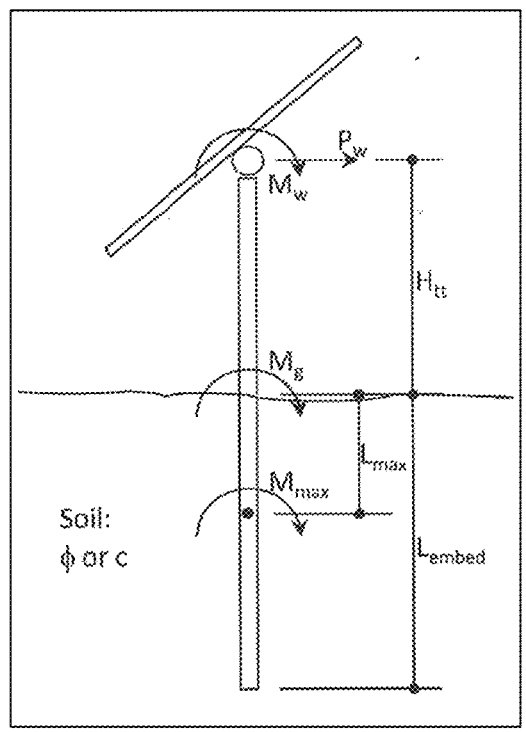
FIG. 13 illustrates piles' parametric model schematic.

Instead of resolving the soil-pile interaction by means of the set of non-linear elastic foundation equations, Optimization device 10 uses a parametric model derived from a number of cases which were solved per these equations. Because the geometry and load range for piles supporting solar tracking structures has relatively small variation across manufacturers and project sites, it is possible to find a set of parametric equations describing the soil-pile interaction behavior with sufficient accuracy (+/−10% variation) and minimal computing cost. The set of equations has been obtained from least square adjustment of proposed curves based on data fitting. The parametric model equations solve for (i) the embedded length of the pile, (ii) the maximum bending moment, and (iii) axial and lateral-torsional buckling. The results of the parametric model for pile sizing purposes are the total length of the pile and the required steel section. FIG. 13 illustrates a schematic of a tracker foundation pile and variables in the parametric model.

The input data for the parametric model includes (i) reveal length of the pile, (ii) mechanical soil properties, (iii) soil corrosion level, and (iv) top-of-pile loads from tracker operation. Once the piles have been sized, the materials cost of steel can be determined for a given grading solution. Completing the cost equation for the project requires input of additional freight and installation costs data.

1.7—Slope Ties to Existing Terrain

Figure 17:
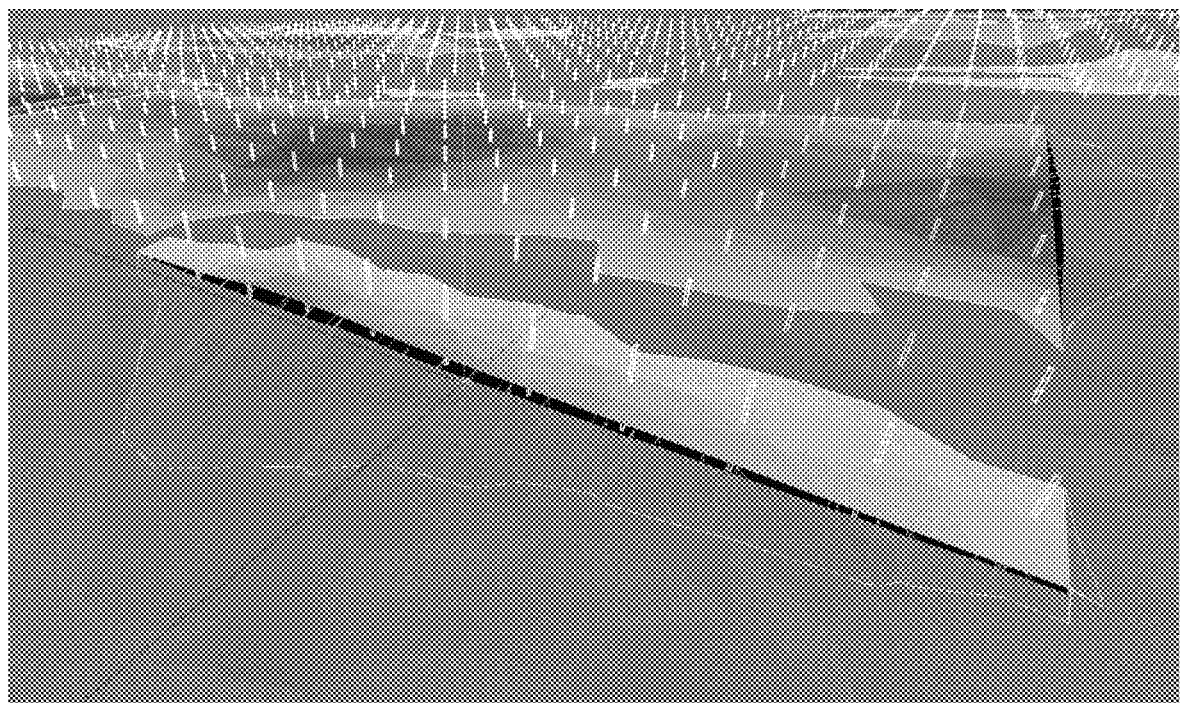
FIGS. 17 and 17A illustrate a tie to existing slopes for edge mesh triangles.
Figure 17A:
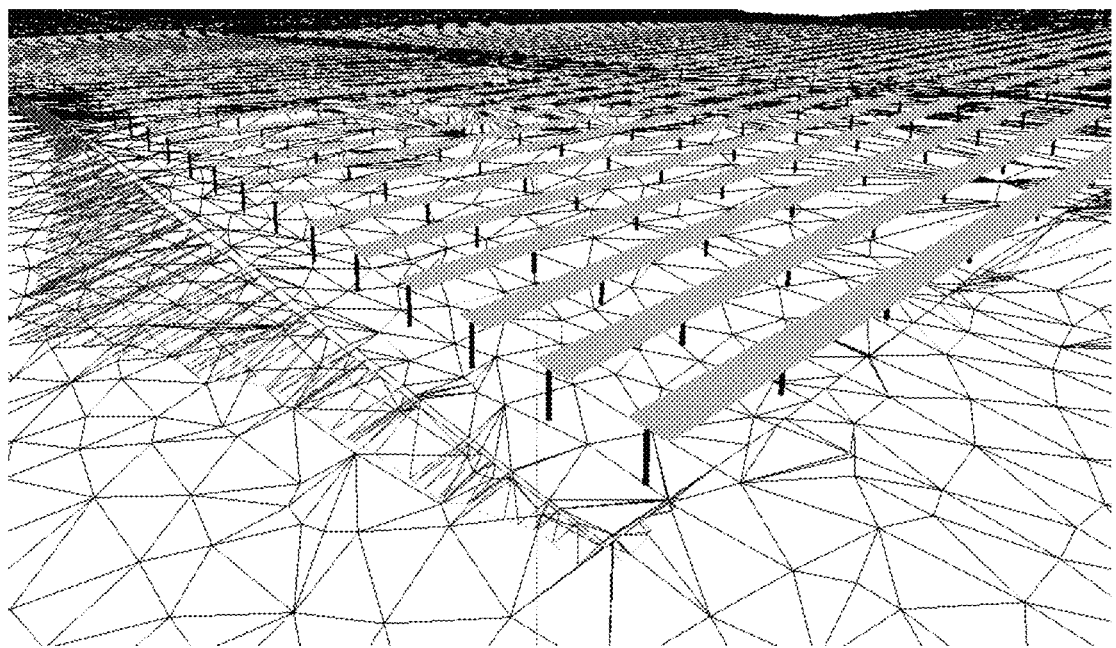

As shown in FIG. 16, the modified triangles at the edges of the system boundaries have elevations different from the adjacent triangles in the undisturbed terrain mesh, therefore creating geometric discontinuity. This is resolved by calculating the tie slopes per a determined angle. FIG. 17 shows the result of the added mesh triangles tying the proposed graded terrain to existing terrain at system edges. This step occurs in the basic grading module 62 of FIG. 3A.

The algorithm to tie to existing terrain consists of the creation of additional triangles in the mesh. Each modified triangle at the edge of the system has one of its sides belonging to that edge (the "free edge"). Among the infinite number of planes containing a "free edge", only one has the predetermined tie to existing slope. The intersection of that plane with the triangles out of the system boundaries define a series of points in the existing terrain. By connecting these points to the end points of the corresponding "free edge", a series of new slope ties triangles are defined.

The envelope of the three dimensional region including the disturbed triangles and the new slope ties triangles is also extracted as a closed polyline in space for further processing of the resulting proposed surface in a separate Computer Assisted Drafting and Design (CADD) software.

1.8—Manual Manipulation of Grading Results 72

Per the Basic Grading Algorithm, the proposed alterations to the existing DTM are exclusively controlled by the geometry of the optimized system mesh 36, as obtained by the Optimization device 10 marching algorithm. In some instances, the user may need to alter the system mesh 36 manually to adapt the proposed grading results to design constrains other than the minimum grading target. Of course, any manual alteration of the system mesh will yield a grading solution departing from minimal earthwork.

Figure 18:
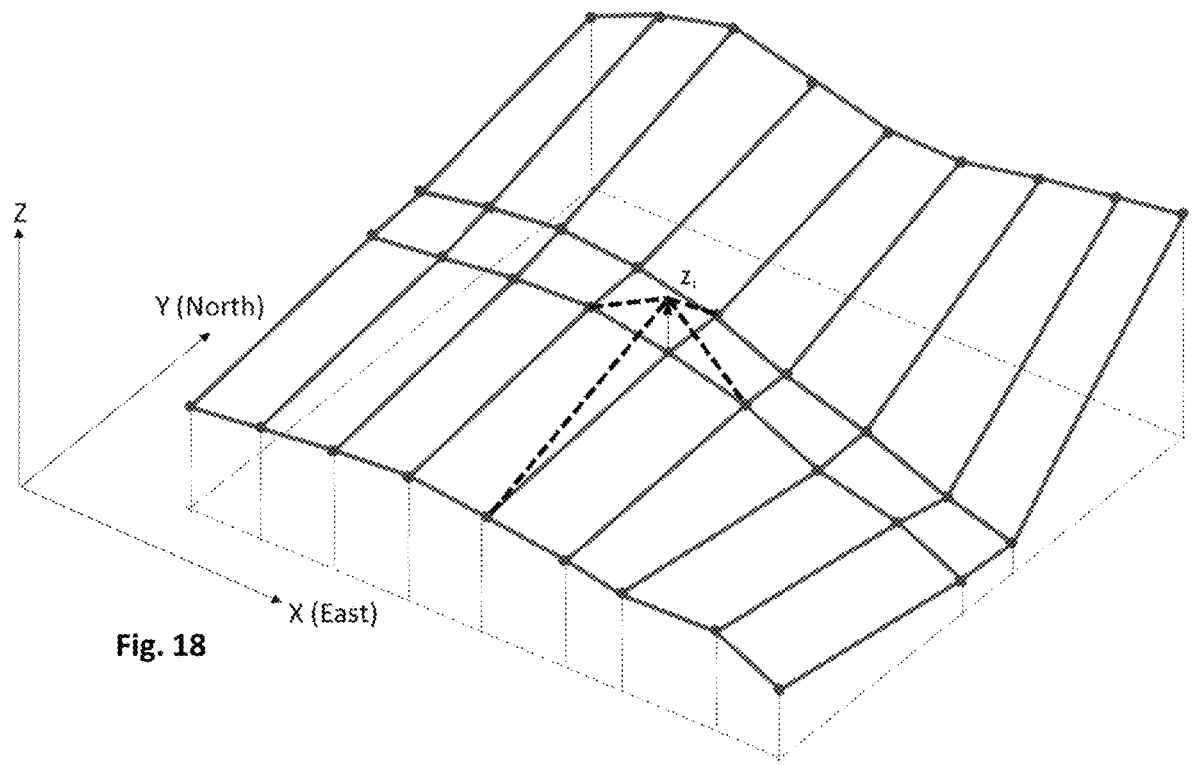
FIG. 18 illustrates node-i in the system mesh is manually pulled up to alter the system mesh locally.

To do so, the software preferably includes the ability to manually alter the elevation of the system mesh nodes and regrade accordingly per the basic grading algorithm. FIG. 18 illustrates the concept of manually pulling the nodes of the system mesh to alter the grading results locally.

Figure 21:
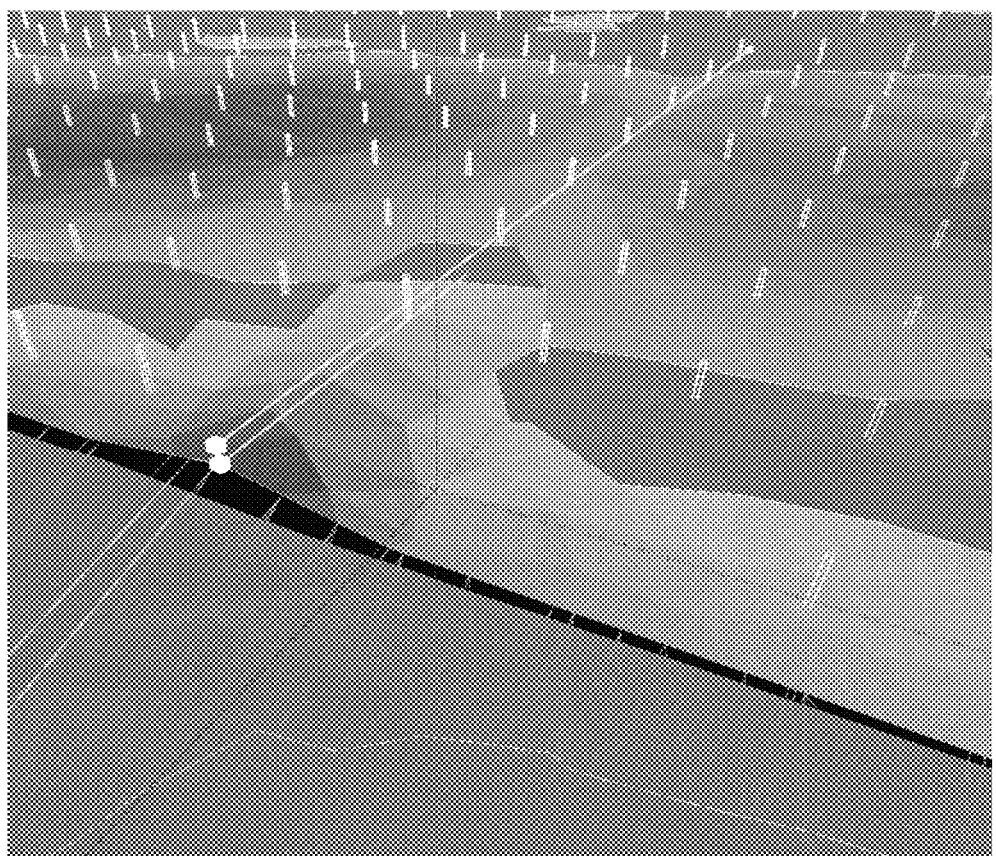
FIGS. 21 and 21A illustrate a resulting grading after manual adjustment of the system mesh.
Figure 21A:
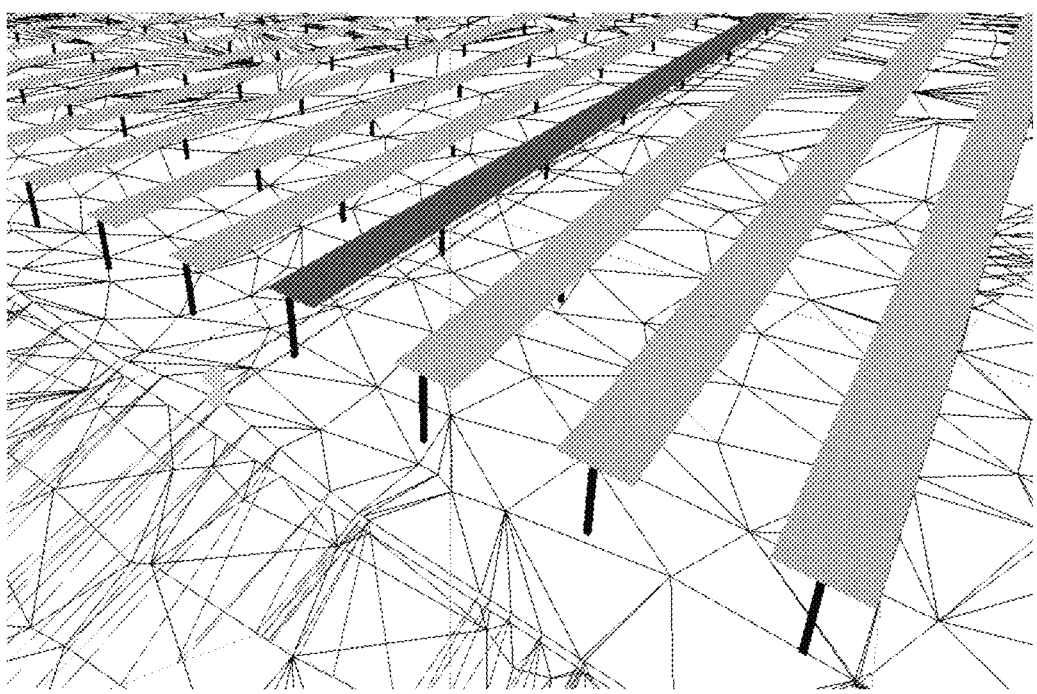

This capability is implemented through the 3D graphic interface of Optimization device 10, by which the user can select a system mesh node on the screen and redefine its topographical elevation, thus distorting the system mesh locally. This action automatically re-grades the DTM to yield a different grading pattern in the affected area. FIGS. 19-21 show screenshots of this process.

1.9—Particular Cases of Ruled Surfaces

Figure 22:
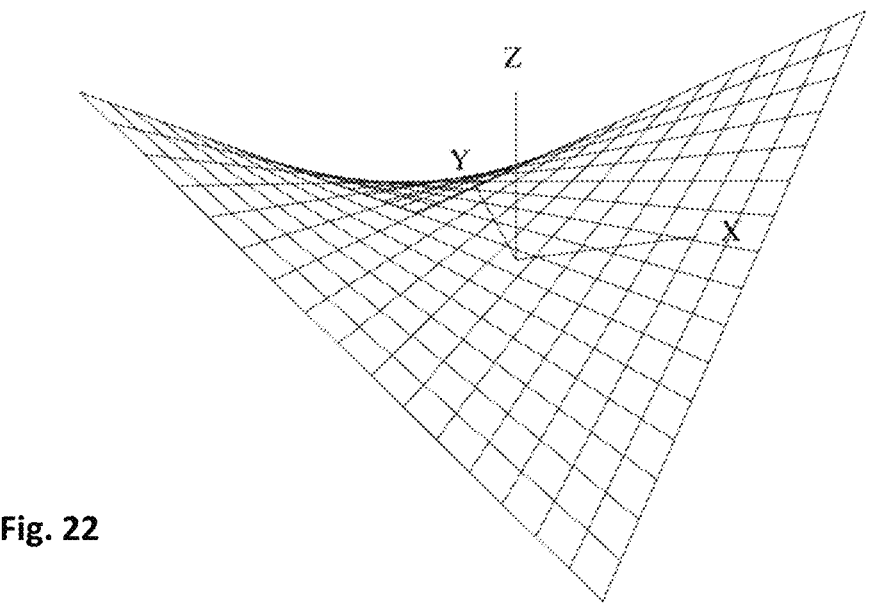
FIG. 22 illustrates a hyperbolic paraboloid.

The geometry of a generic ruled surface can be further restricted to some particular cases:

Hyperbolic paraboloids: This surface is obtained when the swept curves are also straight lines. See, FIG. 22, which illustrates a hyperbolic paraboloid.

Planes: This surface is a particular case of hyperbolic paraboloids when the swept straight lines are parallel.

While the terrain adaption provided by generic ruled surfaces yields the most cost-effective grading solution for solar plants equipped with single axis trackers, it may be convenient in some instances to restrict the geometry to hyperbolic paraboloids or even to planes. This is the case when the geometry and structural design of the single axis tracker requires the proposed grading surface to adapt to these restrictions. Optimization device 10 preferably has these options embedded in the algorithm to allow the user selecting these special cases when needed. To achieve these results, the system mesh constrains are activated accordingly within the marching algorithm. Examples are shown in FIGS. 23-24.

1.10—Grading Control Algorithms for Drainage Design

The Optimization device 10 marching algorithm for minimum earthwork design can be altered to predict and locally correct the grading pattern so to avoid a result that would otherwise impede the positive drainage of the disturbed terrain.

Figure 25:
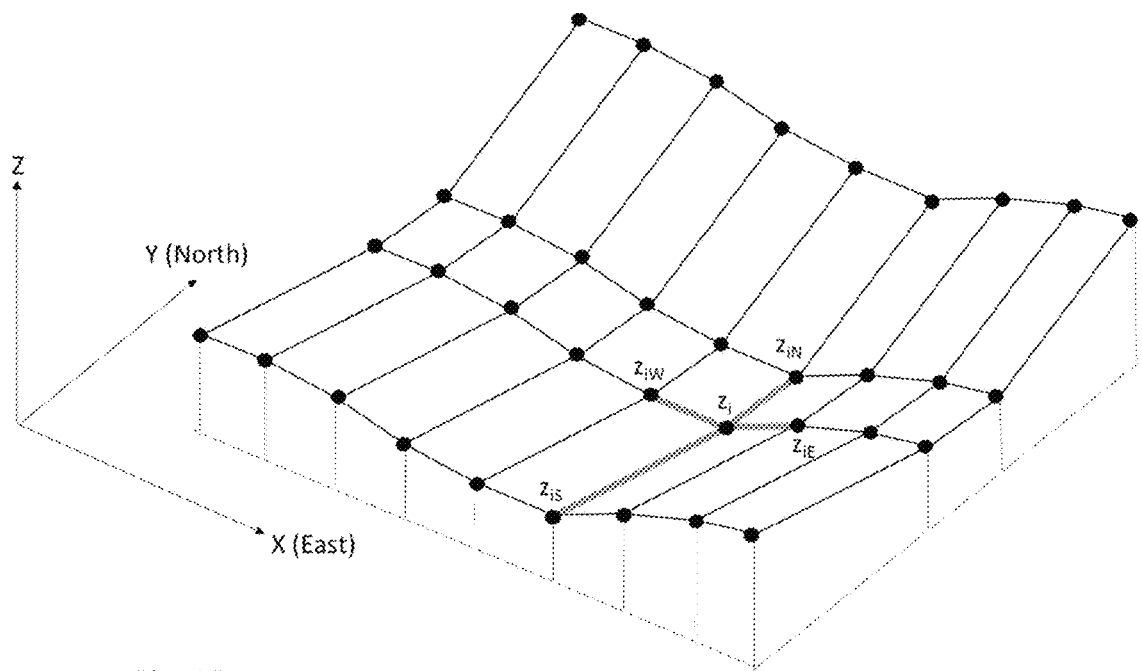
FIG. 25 illustrates node "i" with a topographical elevation lower than all of its neighbors (a "low point").

The algorithm for this process (included in 40) can be based on the fact that the optimized topology of the system mesh would create a water stagnation point (low point) if a node has a topographic elevation which is lower than all of its neighbor nodes. This potential situation is depicted in FIG. 25.

Before reaching this situation, a crosscheck process is preferably embedded in the marching algorithm so that the resulting elevation of each node is compared to the elevations of its neighbors at each step in the iteration. As soon as a "low point" is detected through the iterative process, the amplitude of the marching step for the affected node is set equal to the average of its neighbors, therefore eliminating this condition in the following iteration step. As the iterative process progresses, the location of the "low points" propagate through the system mesh until reaching the system edges, where theoretically positive natural drainage is achieved through the existing undisturbed terrain, out of the limits of the proposed grading.

This low point correction strategy inevitably distorts the minimum earthwork design point, in this case for the sake of project constructability.

It may occur that proposed grading still creates potential low points at the system boundaries. This is because of the difference in elevations between the system mesh lines and the corresponding "cut" and "fill" associated lines controlling the grading depth.

Figure 26:
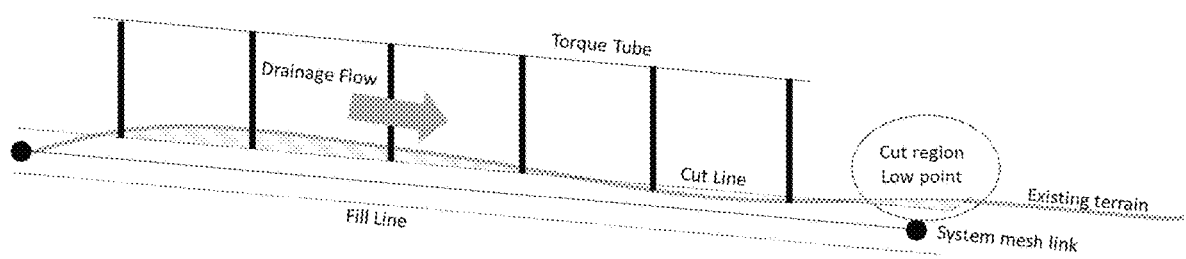
FIG. 26 illustrates a low point created by a cut line in its lower end and at an edge of the system mesh.

If a cut line produces grading at its lower end which happens to be located at the system edge, the proposed grading in that specific location is a potential low point. An example is illustrated in FIG. 26.

A similar situation would occur at the higher end of an active fill line.

Figure 27:
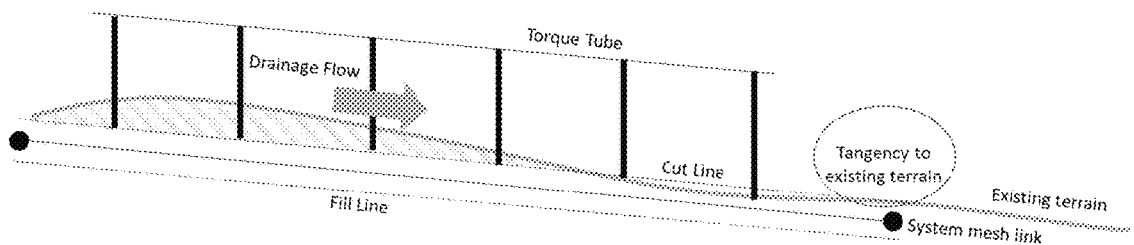
FIG. 27 illustrates a potential low end point corrected through tangency algorithm.

To avoid these situations, the system mesh is automatically distorted at the system edges by setting the elevations of the cut (fill) end points to be the same as the existing terrain, where needed. The result of this corrective algorithm (included in the basic grading algorithm 63) is shown in FIG. 27.

A different situation that may impede positive drainage in proposed grading areas occurs if several adjacent system mesh links have small slope and similar elevations, thus creating an almost planar horizontal region, potentially prone to ponding. To avoid this possibility, the target objective solution can be automatically verified so that no links have a slope smaller than 2%. During the iterative marching algorithm 44, the system mesh approaches this objective solution, therefore reducing the possibility for final mesh links to have slopes smaller than this 2%.

Inspection of results and proceeding with manual adjustments where needed (as previously described in paragraph 1.7) is part of the engineering design process.

1.11—Tools for Inspection of Results

To facilitate the user's inspection of results and deciding if manual changes are needed to improve the solution locally, the following tools can be implemented by software:

Determination of Flow Directions

Figure 28:
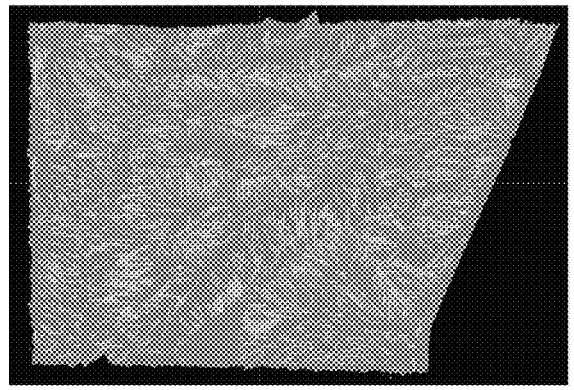
FIG. 28 illustrates and example of flow direction calculation with undisturbed terrain.
Figure 29:
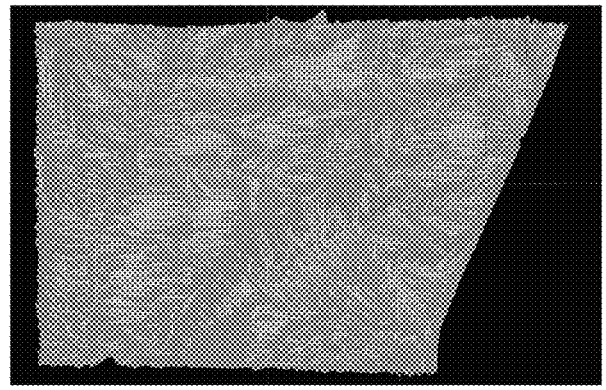
FIG. 29 illustrates an example of flow direction calculation after proposed grading.

This tool can provides a 3D depiction of the run-off flow lines based on terrain elevations before and after grading. The algorithm is based on the calculation of upslope areas using a superimposed rectangular grid digital elevation model, with grid nodes' elevations adapted to the DTM triangular mesh. The procedure is based on representing flow direction as a single angle taken as the steepest downward slope from each rectangular cell upon inspection of the topographical elevations of its eight adjacent cells in the rectangular grid. The methodology follows the well-known recursive algorithm for single flow direction. FIGS. 28 and 29 shows an example of the typical output yield by this flow direction calculation method.

Figure 30:
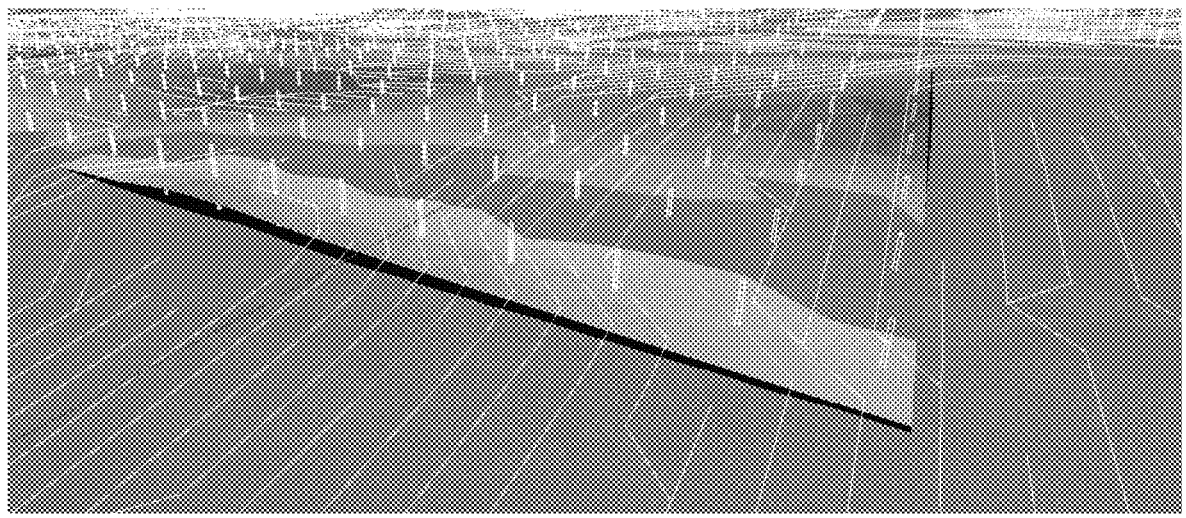
FIG. 30 illustrates a zoom-in of flow direction inspection on an area with proposed terrain alteration.

Once a grading solution is calculated, the detailed inspection of the run-off flow lines on the disturbed terrain helps the user to locate any potential low points and/or water stagnation areas. In these points, the manual regrading tool is used to find a local solution. See, FIG. 30.

Contour Lines

Depiction of terrain contour lines before and after grading helps the user to detect potential low points and/or flat horizontal areas. While the determination of flow direction provides a qualitative analysis (positive drainage test), the topographic contour lines visualization helps to quantitatively determine the slope of the terrain.

Figure 31:
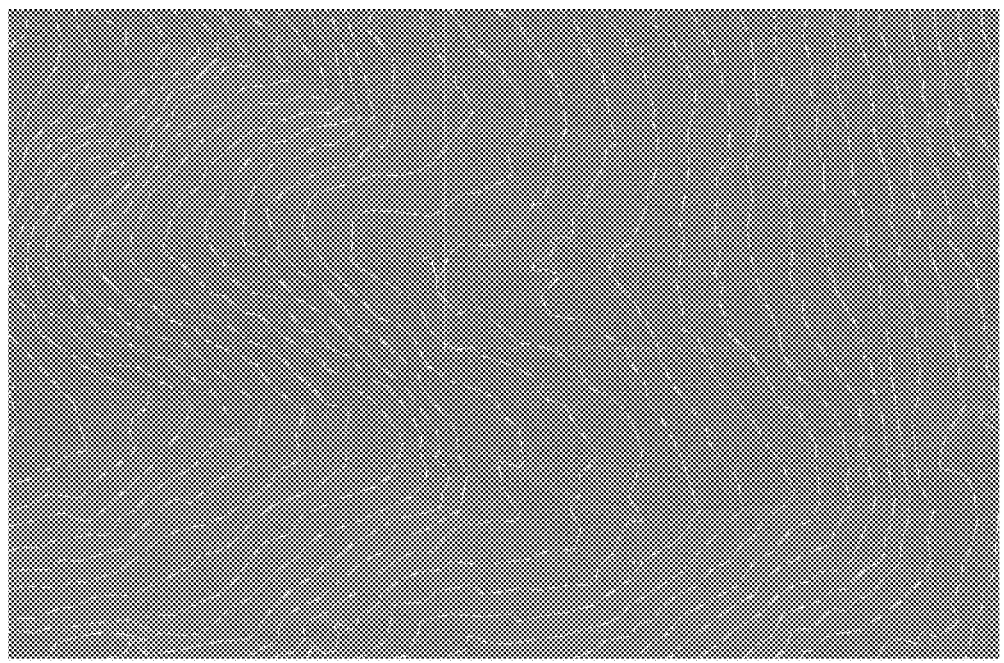
FIG. 31 illustrates a typical depiction of contour lines.

The algorithm for depiction of contour lines is based on the geometric fact that, if the line in space obtained as the intersection between the plane containing a DTM mesh triangle and a horizontal plane of given elevation intersects the DTM triangle sides, then this segment of the line within the DTM triangle is a contour line for the given horizontal plane elevation. By connecting all segments, the full map of contour lines can be found for the terrain for several horizontal planes at corresponding different elevations. An example of the contour line representation is shown in FIG. 31.

Terrain Elevation Heat-Maps

A different way to evaluate terrain elevation gradients and explore the DTM topography before and after proposed grading is by displaying each triangle in the DTM with a different color, the color being mapped per the topographical elevation of the triangle barycenter (z), where dark blue is lowest elevation in the DTM and dark red is the highest elevation. The equation for the Red-Green-Blue color combination (RGB scale) assigned to each triangle is as follows:

$$p = \frac{z - z_{min}}{z_{max} - z_{min}}$$

If $p > 0.5$ $R = -8.0672\ p^2 + 13.701\ p - 0.6734$ $G = -3.9929\ p^2 + 4.019\ p + 0.019$ $B = 0$

Figure 32:
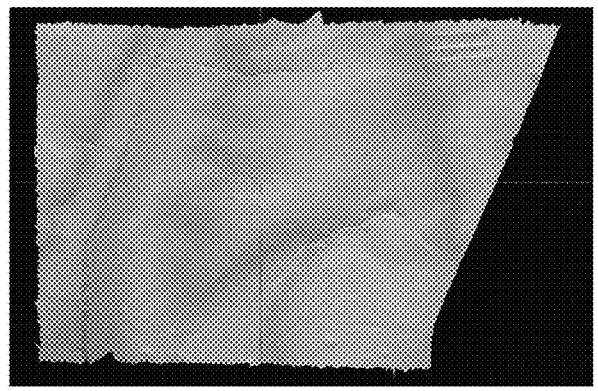
FIG. 32 illustrates a typical depiction of color-mapped topographical elevations before grading.
Figure 33:
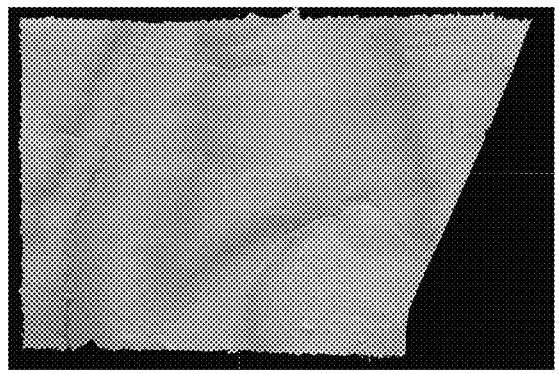
FIG. 33 illustrates a typical depiction of color-mapped topographical elevations after grading.

If $p \leq 0.5$ $R = 0$ $G = -3.9929\ p^2 + 4.019\ p + 0.019$ $B = -0.3221\ p^2 + 3.4062\ p + 0.6734$ An example of the color-mapped topographical elevation graphic result is shown in FIGS. 32 and 33.

Terrain Slope Filters

The slope of each triangle in the DTM can be evaluated by calculating the normal vector of the plane containing the triangle. The vectors obtained by projections of the normal vector onto both the XZ and YZ planes are evaluated for their angle with respect to the horizontal plane XY.

Figure 34:
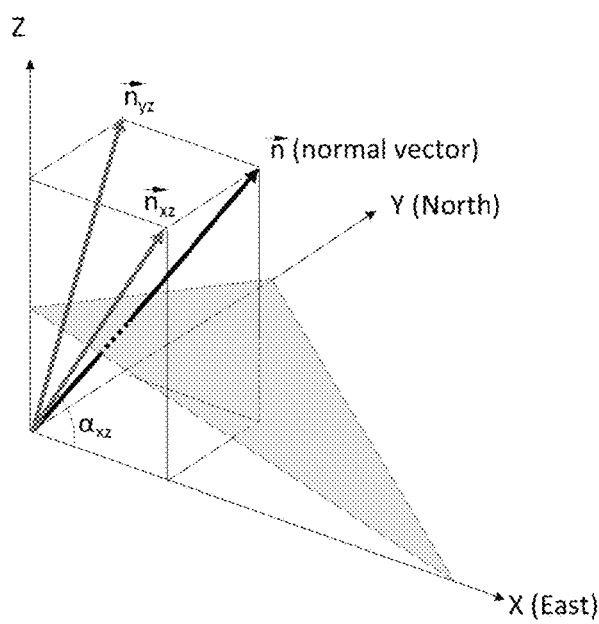
FIG. 34 illustrates a triangle facet normal vector and projections to determine the triangle slope with respect to E-W and N-S directions.

FIG. 34 shows the normal vector (n) of a triangle facet and its corresponding projections onto the XZ and YZ planes (vectors $n_{xz}$ and $n_{yz}$, respectively). The angles between vectors $n_{xz}$ and $n_{yz}$, and the horizontal plane are $\alpha_{xz}$ and $\alpha_{yz}$, which determine the slope of the triangle facet with respect to the E-W and N-S directions respectively.

A graphic filter can be applied to all the triangles in the DTM so that triangles with N-S or E-W slopes higher than a specified threshold are highlighted in a different color. This provides a visual verification tool for the user to check that the design angular restrictions for the system mesh have been fulfilled through the marching algorithm process and correctly transmitted to the proposed grading.

Figure 35:
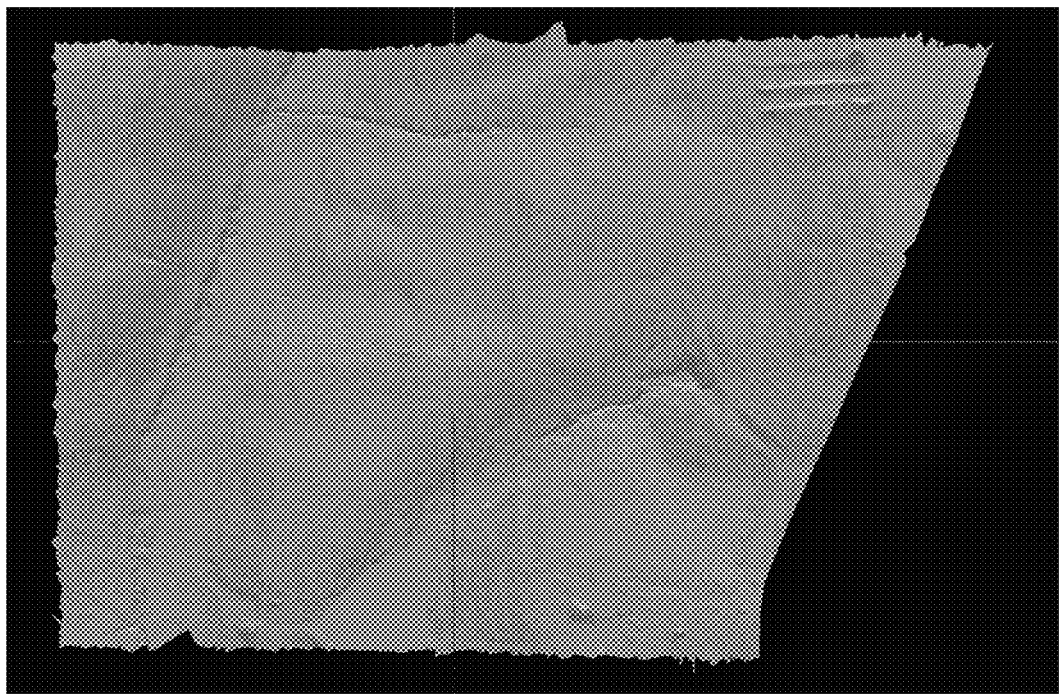
FIG. 35 illustrates a typical depiction of highlighted triangles having an E-W slope larger than a certain threshold.

An additional filter for the absolute slope of the normal vector can also be available for the user to verify areas with potentially high scour risk. See, FIG. 35.

Pile Heat-Maps and Pile Text File Output

Optimization device 10 can also provide a graphic representation tool to verify that the reveal length of the piles after proposed grading are within the input data limits. The difference between these two limits is the "delta" parameter, which has a relevant impact in the proposed solution and therefore in earthwork intensity.

Figure 36:
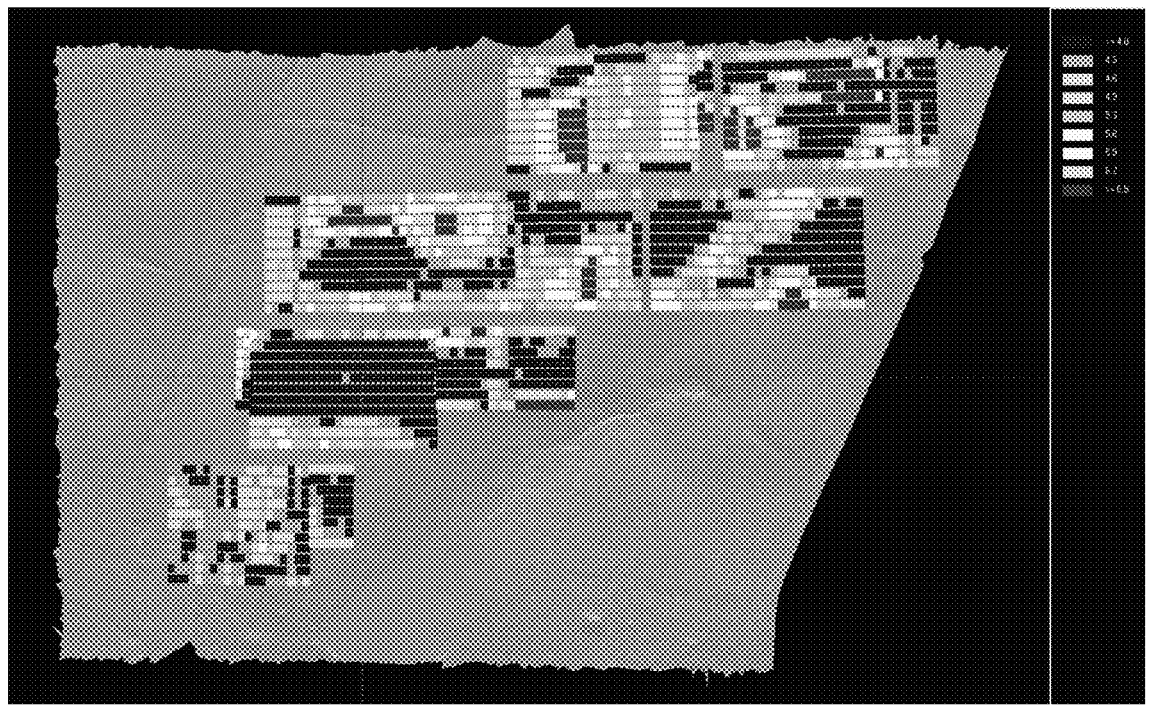
FIG. 36 illustrates a typical representation of pile reveal length distribution. Note the color scale legend in the top-right corner of the image.

The reveal length of the foundation steel piles after grading can be depicted as a color scale, the assigned color being mapped per the corresponding reveal length (dark blue for minimum reveal length, and dark red for maximum reveal length). Visual inspection of the pile reveal's distribution heat-map facilitates the validity of the proposed grading solution. An example of the graphic output is shown in FIG. 36.

Following the same principle, similar heat-maps are also available for graphic depiction of other geometric variables pertaining the calculated steel pile foundations, as the heat-maps for total length of the piles and for the embedded length of the piles. The former is useful for logistic purposes at the field during construction, as this representation provides geographic information for material deployment. The second is useful for construction schedule phasing and planning reasons, as pile driving time is proportional to embedded pile length.

Figures 37, 38:
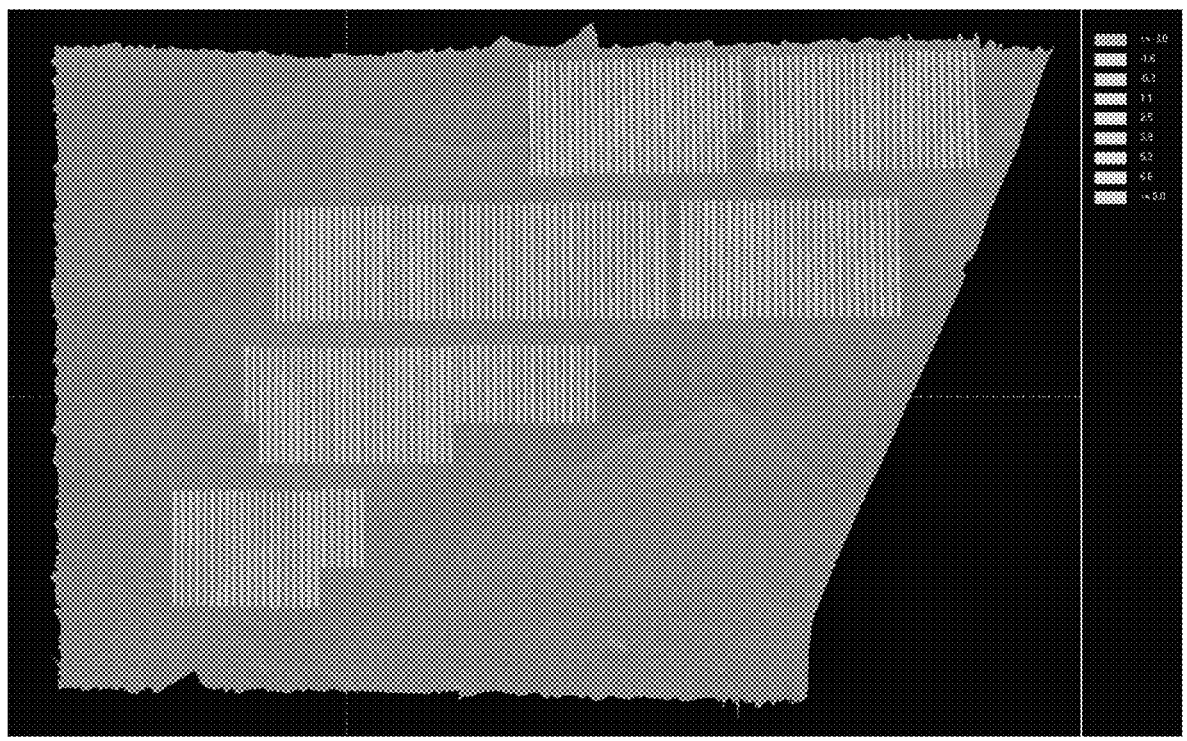
FIG. 37 illustrates a typical list of piles with design and installation details.
FIG. 38 illustrates a typical representation of Tracker's N-S tilt angle distribution. Note the color scale legend in the top-right corner of the image.

Pile geometry data can compiled and listed on a pile-by-pile basis through an output text file. The tabulated information listed in the files includes: (i) the pile id number, (ii) block and sequential tracker numbers the pile belongs to, (iii) georeferenced X,Y coordinates for the piles, (iv) topographical elevations (georeferenced Z-coordinates) for ground elevation before and after grading at pile locations, top of pile elevation after installation, etc. (v) calculated steel section for the pile per the structural calculation parametric model. A sample of the pile data text file is shown in FIG. 37.

Single Axis Trackers' N-S Angle Heat-Maps and Text File Output

Optimization device 10 can also provide a graphic representation tool depicting the N-S tilt angle of the single axis trackers in the solar system. This helps the user to verify that the angular restrictions imposed to the trackers as input data set for the simulation are fulfilled after the proposed grading.

The N-S tilt angle of the trackers' torque tube (or axle) are shown per a color scale, the assigned color being mapped per the corresponding angle (dark blue for minimum negative values-oriented North-, and dark red for maximum positive angles-oriented South-).

The N-S tilt angle distribution of the trackers has a relevant impact in the energy production of the solar plant, as it affects the incidence angle of solar beams onto the solar photovoltaic modules mounted on the trackers. Optimization device 10 can automatically output a text file with the tracker identification number and the resulting N-S tilt angle. This tabulated data provides the user with sufficient detailed information to derive the frequency distribution of the N-S angle of the trackers, thus to estimate a geometric correction factor for the overall energy production of the solar plant with respect to a perfectly flat and horizontal solar plant layout.

A sample graphic output of the tracker's N-S angle distribution is shown in FIG. 38.

1.12—Interface with Other Engineering Software

Optimization device 10 preferably has built-in routines to export the simulation results to other industry-standard solar engineering software tools, commonly used to (i) estimate the energy production of the resulting solar system after the grading design has been optimized in Optimization device 10, and (ii) complete the construction exhibits (solar system engineering drawings) with other standard CADD tools. This is achieved by writing the geometric output of the simulations in the corresponding standardized interchange file formats.

Interface with Energy Yield Simulation Software

One of the industry standard software for energy yield simulations of solar photovoltaic systems is PVSyst© developed by the University of Genova, Switzerland. PVSyst allows a user to evaluate the energy production loss due to mutual shading of single axis trackers when the layout of the solar system is not contained in a single plane. To run this mutual shading analysis and determine its impact on the energy yield of the solar system, the user shall define the topographical elevations of each tracker. This can be done either manually or reading the so called "shading scene" from the specific file format compatible with the PVSyst software.

Figure 39:
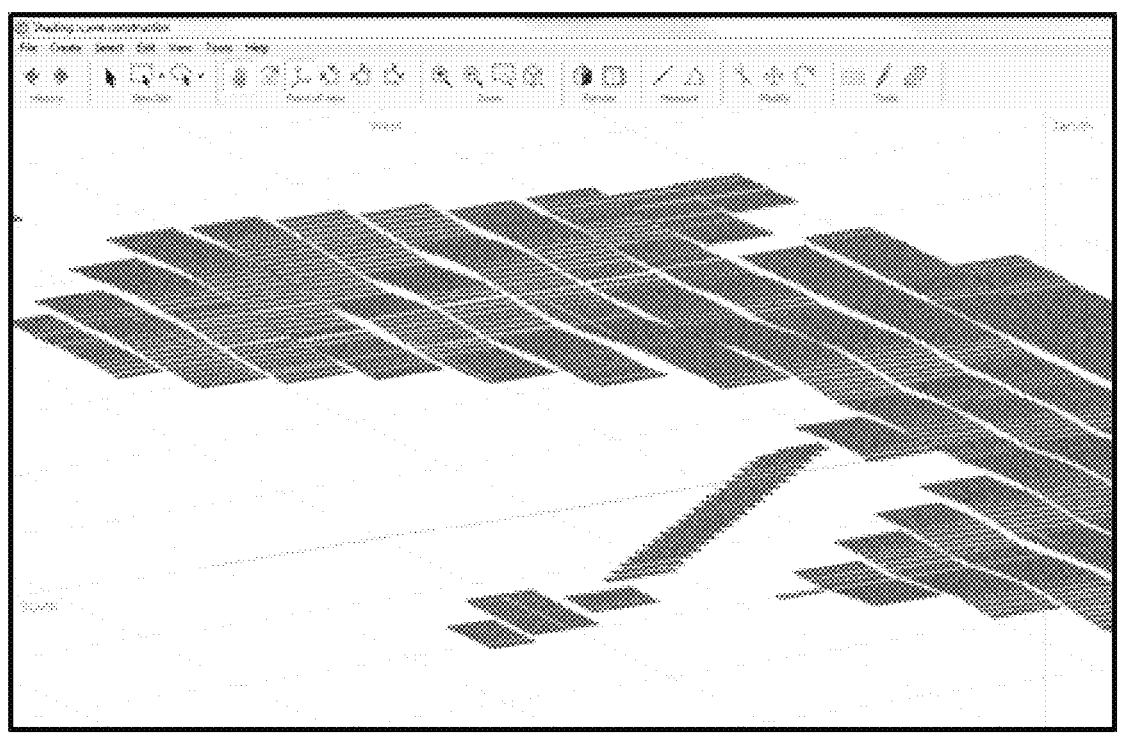
FIG. 39 illustrates a solar system geometry as obtained with Optimization device 10 once imported in PVSYSt for solar system energy yield evaluation.

Optimization device 10 preferably can automatically produce the compatible "shading scene" files with the geometric data for all the trackers in the solar system for direct simulation of the energy yield estimations. FIG. 39 shows a sample "shading scene" obtained from a grading simulation in Optimization device 10, once rendered in PVSyst.

Interface with Computer Aided Drafting and Design (CADD) Software

Optimization device 10 preferably has a built-in function to export the DTM computational mesh in standard DXF file format. DXF is a file extension for a graphic image format typically used with CADD software. DXF stands for Drawing exchange Format, which is widely used in the engineering industry to facilitate exchange of virtual models' entities and properties across different engineering software platforms.

With this Optimization device 10 functionality, the proposed grading geometry after simulation can be read by other CADD specific software where the final design engineering exhibits (civil construction drawings) are completed.

1.13—Energy Yield Optimization Device

Figure 40A:
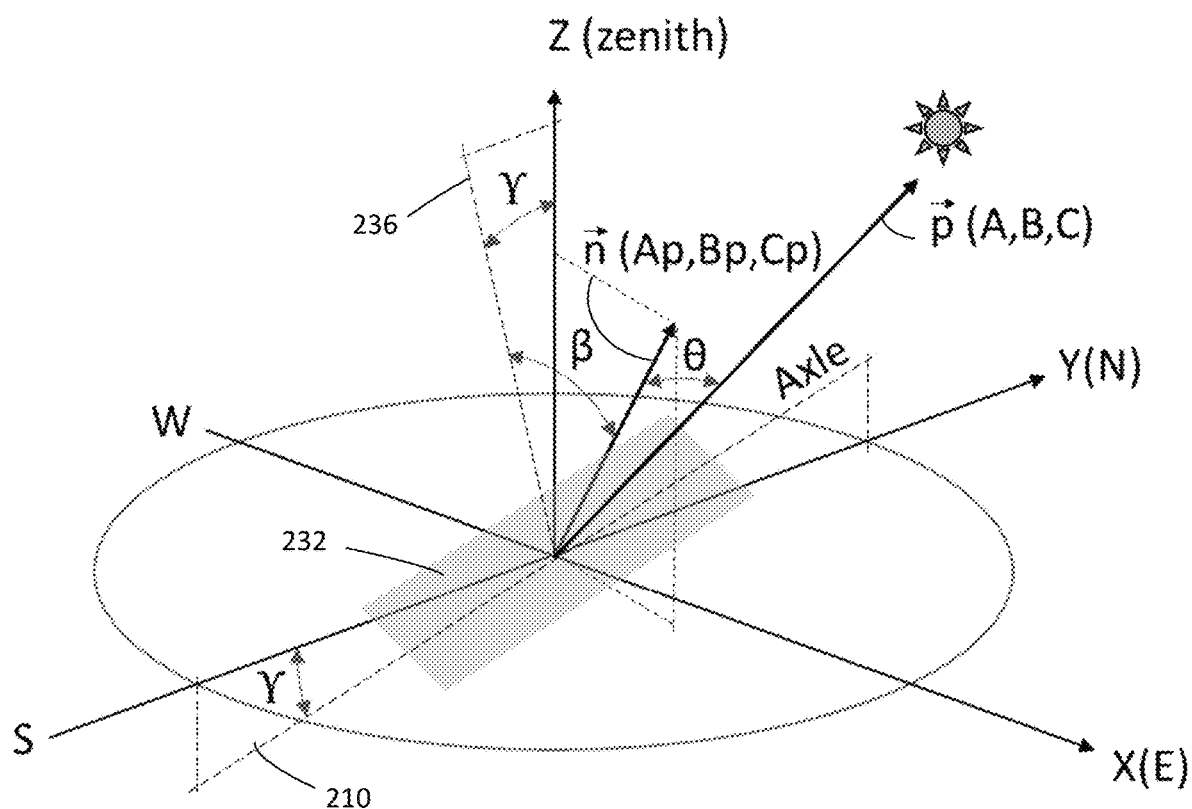
FIG. 40A illustrates an embodiment of the objective state solution where axle rotation angle β is such that angle θ is minimized.
Figure 42:
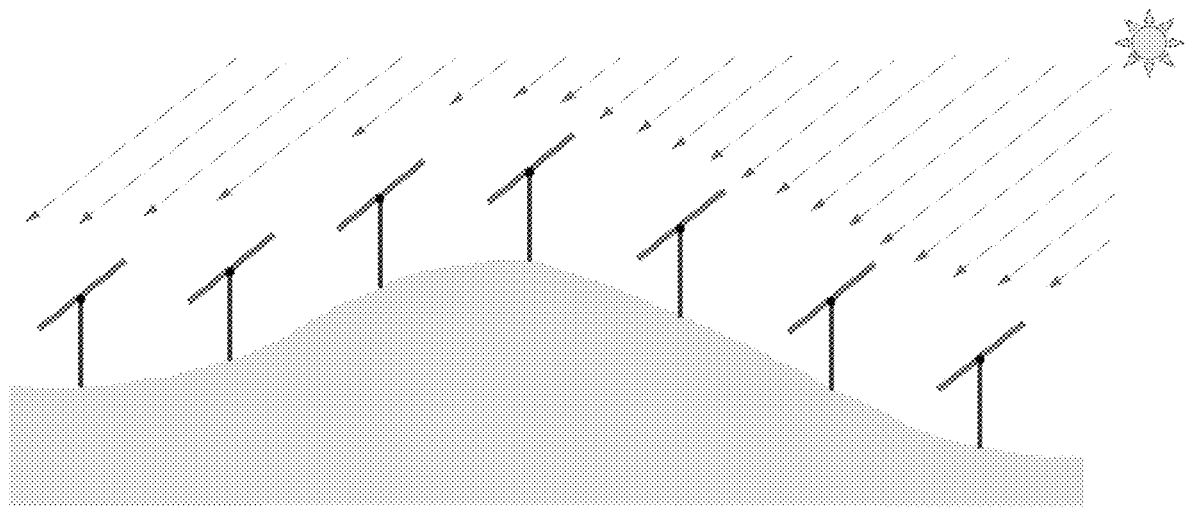
FIG. 42 illustrates seven rows of single axis trackers 230, where each tracker is oriented on a different plane than the other trackers (i.e., non-planar single-axis trackers). The trackers are angled to avoid row-to-row shading.
Figure 43:
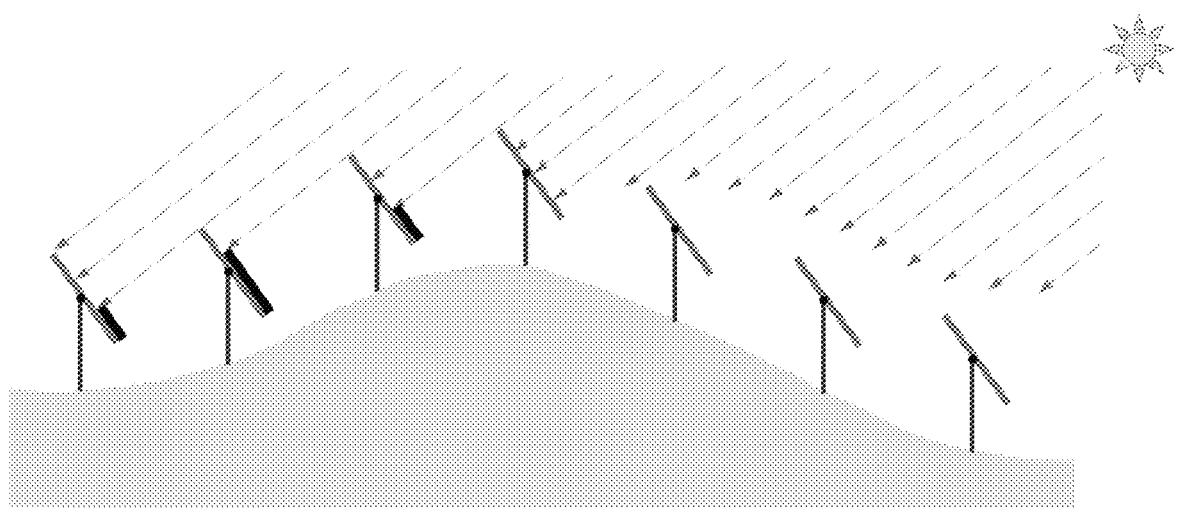
FIG. 43 illustrates seven rows of single axis trackers 230, where each tracker is oriented on a different plane than the other trackers. The trackers are angled to maximize energy production while ignoring row-to-row shading.

An energy yield optimization device can be used to optimize energy yields for a utility-scale photovoltaic power plant comprising a plurality of non-planar single-axis trackers. For the purposes of this specification, non-planar single-axis trackers refers to utility-scale photovoltaic power plants that have undulating (non-planar) topography. See, e.g., FIGS. 42-44. Because of the undulating topography, the rotating axle 210 of the solar trackers will not necessarily be horizontal. Typically, the rotating axles 210 will have a North-South tilt angle γ measured from the horizontal plane. See, FIGS. 40A and 40B. The axle tilt angle γ would be expected to be different for each independent rotating axle 210 in the field.

Optimizing energy yields for a utility-scale photovoltaic power plant comprising a plurality of non-planar single-axis trackers is elusive because (a) the field of single axis trackers can all have different three-dimensional axle 210 orientations and (b) the relative position of the sun is constantly changing. But, in addition, there is a third problem: "row-to-row shading."

In utility-scale solar photovoltaic power plants equipped with multiple tracking structures, row-to-row shading occurs when the sun position is close to the horizon (i.e., after dusk and before dawn for a varying period). Row-to-row shading is critical because even partial shading of a single solar module 232 can be expected to reduce the power production of its entire string of modules mounted on the single axis tracker to nearly zero. As a result, it is standard practice to alter the instantaneous tracker rotation angle β to avoid row-to-row mutual shading effect. The strategy to avoid mutual row-to-row shading is commonly referred to as 'backtracking'.

Finding the optimum axle rotation angle β for each axle in a non-planar utility-scale solar photovoltaic power plants for any time of day without permitting any row-to-row shading is extremely complex and cannot be done by hand. Nor can it be done as a practical matter by attempting to program a computer to directly compute the single optimum solution. As discussed in more detail in the following paragraphs and drawings, the preferred solution deploys a marching algorithm to achieve a preferred optimum solution.

Like the optimization device 10, the energy yield optimization device preferably uses the same hardware and software as previously described in paragraphs 55-57 and shown in FIGS. 2, 3A and 3B. At a minimum, the energy yield optimization device would include a central processing unit having a memory with instructions stored therein for causing the central processing unit to incorporate a set of known geometric coordinates the entire field of single axis tracker being optimized for energy production. It is preferred to use the geometric data output from the optimization device 10. But using the output data from the optimization device 10 is not necessary. At a minimum, what is necessary is a data set comprising at least the three-dimensional coordinates of the single axis axles 210 and the three-dimensional coordinates of the solar modules 232 connected to each axle 210. This data set could be obtained, for example, from as-built field measurements.

In addition to geometric data defining the single axis tracker coordinates, solar data relating to the position of the sun at any given time during the year must also be used as an input data set. Together, the energy yield optimization device described below combines (a) the geometric data of the single axis trackers with (b) the solar data to calculate a final-state solution that optimizes energy yields for the plurality of non-planar single-axis trackers at any point in time, all while eliminating row-to-row shading. The following paragraphs describe more fully the preferred steps.

The Objective State Solution

Figure 41A:
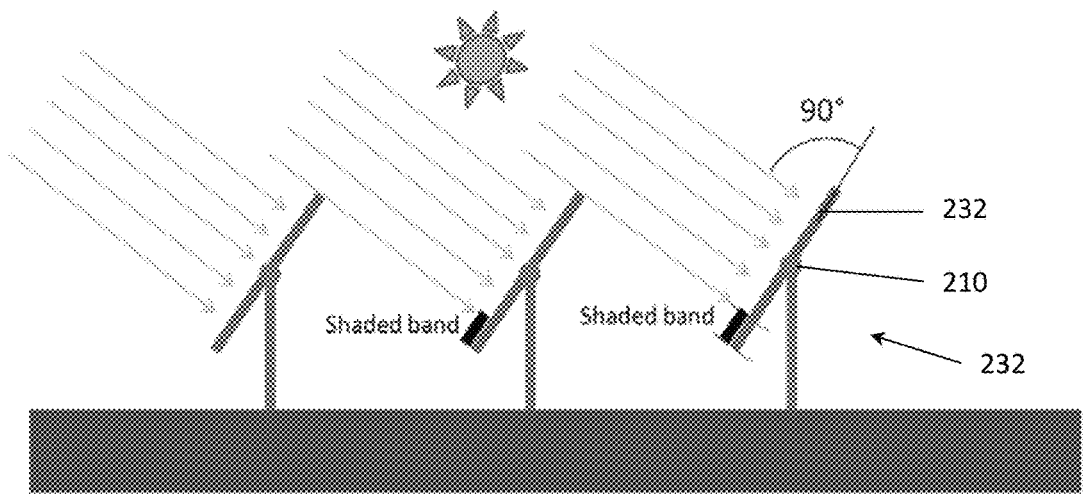
FIG. 41A illustrates three rows of single axis trackers 230, where all of the trackers or oriented on the same plane. The trackers are angled to maximize energy production while ignoring row-to-row shading.
Figure 41B:
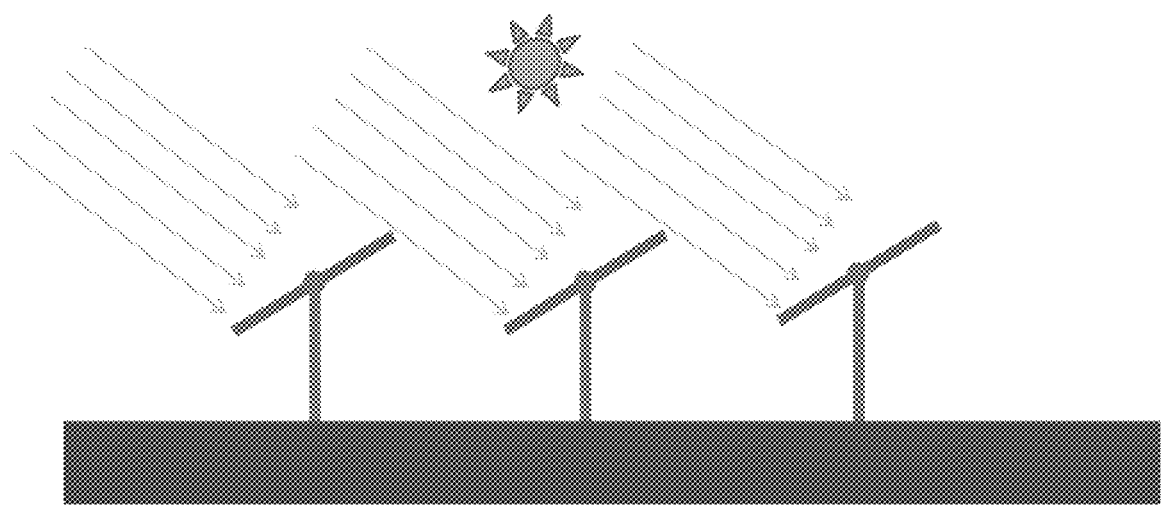
FIG. 41B illustrates three rows of single axis trackers 230, where all of the trackers or oriented on the same plane. The trackers are angled to eliminate row-to-row shading.

The first step is to calculate an objective-state solution. The objective state solution is the set of tracker rotation angles (B) that maximize the energy yield of a single axis tracker while ignoring shading. For purposes of this specification, axle rotation angle β for the objective state solution is the angle formed between a vertical vector 236 rotated the axle tilt angle γ with respect to the East-West axis, and a normal vector $\vec{n}$ emanating from the surface of the module 232. See, FIG. 40A. Not surprisingly, the objective state solution changes as the instantaneous sun position vector $\vec{p}$ changes due to the time of day, time of year and site latitude. FIG. 41A is an example of an objective state solution where row-to-row shading occurs.

Finding the objective state solution at any point in time for a horizontal single-axis tracker is relatively straight forward. A bit of complexity arises, however, when a single-axis tracker has a non-horizontal rotating axle 210. FIG. 40B illustrates axle tilt angle γ, which is measured from the horizontal plane. Ordinarily, it would be expected that the tilt angle γ for each independent rotating axle 210 would be different for each single-axis tracker in a utility-scale solar field.

Figure 40E:
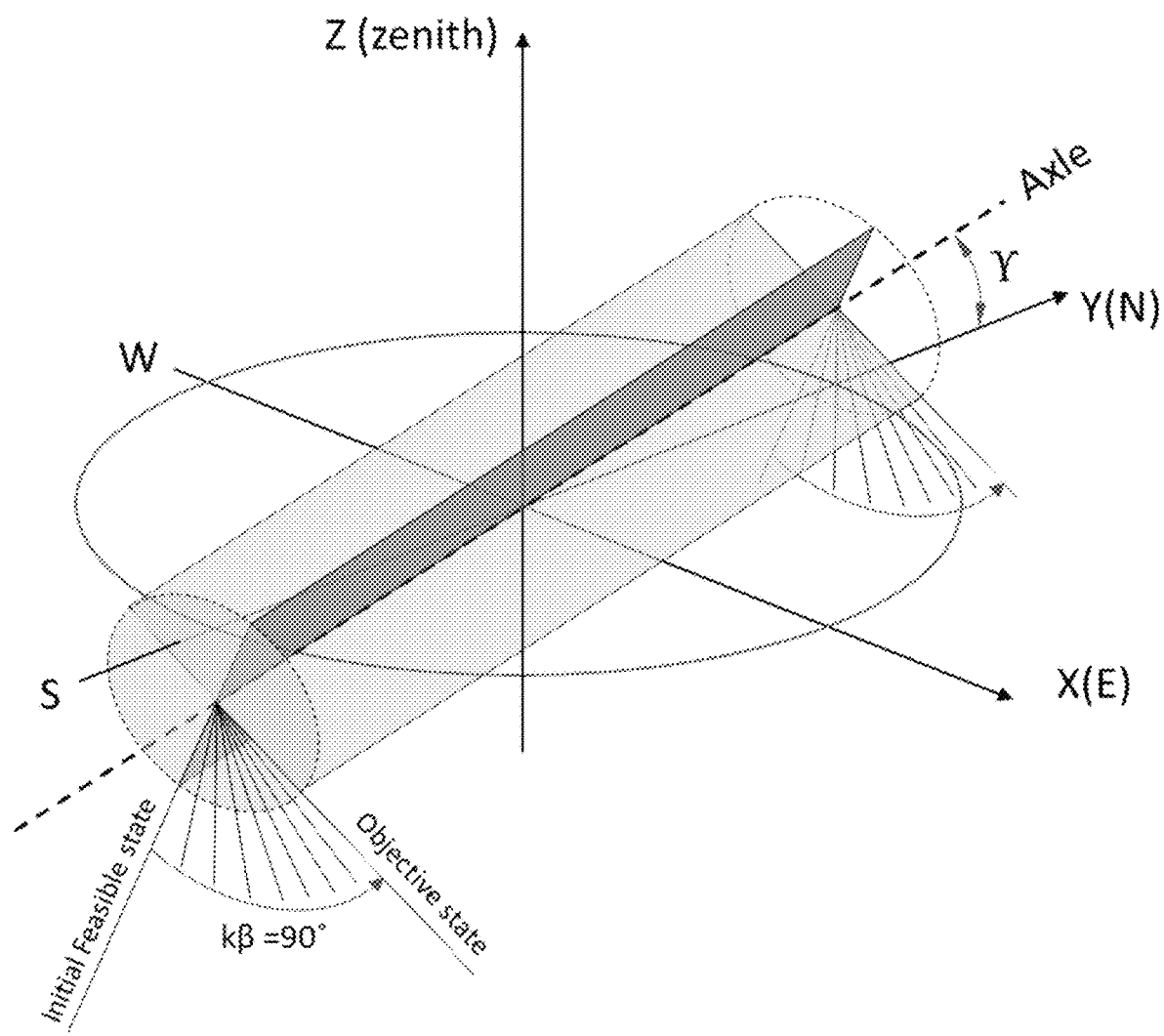
FIG. 40E illustrates an embodiment of k-iterative rotational marching steps between the initial feasible state and the objective state.

The objective state solution can be found by using the "maximum shading-ignored energy angle" equation:

$$\tan\beta = \frac{-A}{B\sin\gamma - C\cos\gamma}$$

where (A, B, C) are the Cartesian coordinates of the unit vector pointing to the instantaneous solar position $\vec{p}$ (FIG. 40). This tracker rotation angle (β) maximizes the production of the solar modules mounted on the tracker axle in function of the given axle tilt γ and the instantaneous sun position, which is in turn dependent on the site latitude, day of the year, and time of the day. However, while the objective state solution yields the maximum power output for the system it does so while ignoring whether row-to-row shading might be occurring. For this reason, the objective state solution is not a feasible solution for the energy optimization problem.

The Optimum Feasible Solution

The optimum feasible solution is the set of axle rotation angles β where two things must be true: (a) zero row-to-row shading occurs and (b) each independent axle is positioned to achieve maximum power output without inducing any row-to-row shading. As previously mentioned, row-to-row shading occurs when one single-axis tracker blocks at least part of a solar module 232 located on a different single axis-tracker from receiving sun rays. See, e.g. FIG. 41A. Row-to-row shading is critical because if any part of a solar module is shaded, the energy output of the string to which the shaded module belongs in the single-axis tracker 230 is typically reduced by at least 90%.

There are infinite possible solutions for the combinations of the independent axle rotation angles, but only one which maximizes the overall system energy yield in backtracking periods. Resolving this optimization problem is computationally intense, and manual solutions would be impractical due to extreme amounts of time required. Attempting to directly calculate the exact optimum feasible solution is extremely costly in terms of both computer RAM requirements and time.

Rather than attempting to find the exact solution directly, the preferred optimum-feasible solution applies a marching algorithm to find the axle rotation angle β that maximizes energy without permitting any shading. Ordinarily, using the marching algorithm described below will not provide the exact optimal solution (in mathematical terms), but it will yield a sufficiently accurate optimal engineering solution.

The preferred marching algorithm to find the optimum feasible solution follows a similar pattern as the previously described marching algorithm for the optimization device 10. In this embodiment, it is convenient to describe the "state" of the system as an N-dimensional array s which coordinates are the instantaneous rotation angles for each of the N axles 210 in the system:

$$s^t = (\beta_1, \beta_2, \beta_3, \ldots \beta_i, \ldots \beta_j, \ldots \beta_N)$$

For example, the previously described objective-state solution consists of an N-dimensional array in which each coordinate represents the axle rotation angle β corresponding to the maximum power production for each independent axle 210 without accounting for the possibility of row-to-row shading. These values are derived from the maximum shading-ignored energy angle equation discussed above. The objective-state solution is just one point in the N-dimensional space. This point is called $s^{obj}$:

$$s^{obj} = (\beta_1^{obj}, \beta_2^{obj}, \beta_3^{obj}, \ldots \beta_i^{obj}, \ldots \beta_j^{obj}, \ldots \beta_N^{obj})$$

In the N-dimensional space, the square of the distance between a feasible states and the objective state $s^{obj}$ is evaluated with the function:

$$f(s) = |s - s^{obj}|^2 = \sum_{i=1}^{N} (\beta_i - \beta_i^{obj})^2$$

The first step of the marching algorithm is to set an initial feasible state ($s^{ini}$). The initial feasible state is a state where it is known that no row-to-row shading occurs. It is known that no row-to-row shading will occur for an axle rotation angle β when the sun position vector $\vec{p}$ is coincident with a surface plane of the module 232. See, e.g., FIG. 42. Said another way, no row-to-row shading occurs when all axles' rotation angles β are such that the planes containing the solar modules on each axle 210 have their respective normal vectors perpendicular to the instantaneous sun position vector $\vec{p}$(A, B, C).

The initial feasible state β for each axle 210 can be determined by the following equation:

$$\tan\beta^{ini} = \frac{B \sin\gamma - C \cos\gamma}{A}$$

The next step of the marching algorithm is to calculate a rotation marching step. It is preferred to calculate the rotation marching step by dividing the angular distance between the initial feasible state and the objective state for each axle 210 into k steps. In practice, it has been found that a suitable number for k is between 45 and 180, with 90 being most preferred. In addition, it turns out that the angular distance between the initial feasible state and the objective state for each axle 210 is effectively 90 degrees. Thus, for simplicity, it is preferred to use 90° for the angular distance between the initial feasible state and the objective state for each axle 210. Thus, the iterative rotational marching step can preferably be simplified to between 0.5 degrees and 5 degrees, with 1 degree most preferred.

After obtaining the rotation marching step, the rotation marching step is added to the axle rotation angle β of the initial feasible state. This interim state is referred to as "$s_{k+1}$." In effect, this $s_{k+1}$ rotates a module 232 incrementally closer to the objective state.

Having obtained the $s_{k+1}$ state, the possibility of row-to-row shading must be checked. Checking whether row-to-row shading will happen in the $s_{k+1}$ state can be determined geometrically if the position of the sun is known and the geometric position of the modules 232 are known. For each solar module 232 mounted on each axle 210, two lines parallel to (A, B, C) through the two respective lower corners of the solar module can be calculated. If any of the lines intersect with any other module in the system, then the first module would be shaded by the second. As previously noted, for this shading condition analysis to be completed, the 3D geometry of the full system is needed as input. This information can obtained from the proposed optimum grading solution previously completed with optimization device 10. Alternatively, this data can be obtained from as-built data obtained in the field.

If the $s_{k+1}$ state violates the zero row-to-row shading condition, the axle rotation angles β corresponding to both the axle receiving the shade and the axle producing it are corrected back to their values in the previous iteration and kept constant in further iteration steps.

If the $s_{k+1}$ state does not violate the zero row-to-row shading condition, the rotation marching step should be added to the $s_{k+1}$ state. This new step is referred to as the $s_{k+2}$ state. As in the previous step, the state $s_{k+2}$ state will be incrementally closer to the objective state and therefore comprise a better solution than the previous state $s_{k+1}$.

Having obtained the $s_{k+2}$ state, the possibility of row-to-row shading must again be checked. This is preferably done by the same procedure described above. As before, if the new state $s_{k+2}$ violates the zero row-to-row shading condition, the axle rotation angles β corresponding to both the axle receiving the shade and the axle producing it are corrected back to their values in the previous iteration ($s_{k+1}$) and kept constant in further iteration steps. Likewise, if the new state $s_{k+2}$ does not violate the no row-to-row shading condition, the rotation marching step will be added to the $s_{k+2}$ state. This new step is referred to as the $s_{k+3}$ state. As in the previous step, the state $s_{k+3}$ state will be incrementally closer to the objective state and therefore comprise a better solution than the previous state $s_{k+2}$.

Figure 44:
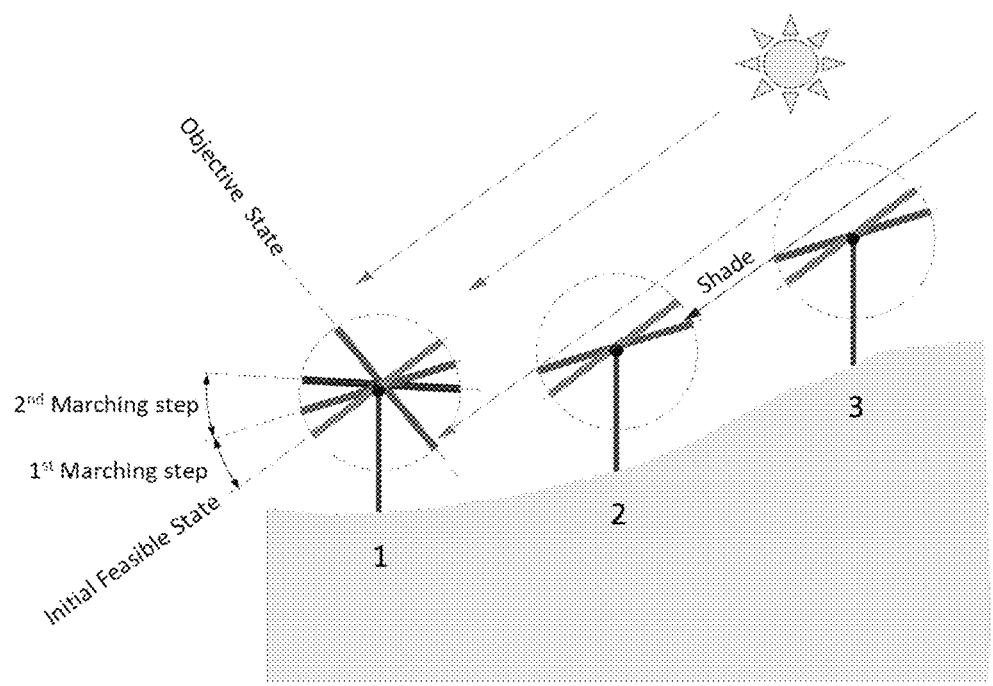
FIG. 44 illustrates an embodiment of three states for three rows of single axis trackers; and initial feasible state ($s^{ini}$), a first marching step ($s_{k+1}$), and a second marching step ($s_{k+2}$). After the first marching step, tracker 3 casts shade on tracker 2. Trackers 2 and 3 return to the previous iteration's position and respective axle rotation angles β remain constant thereafter. Tracker 1 continues marching toward the objective state until shading from Tracker 2 occurs or the objective state is reached.
Figure 45:
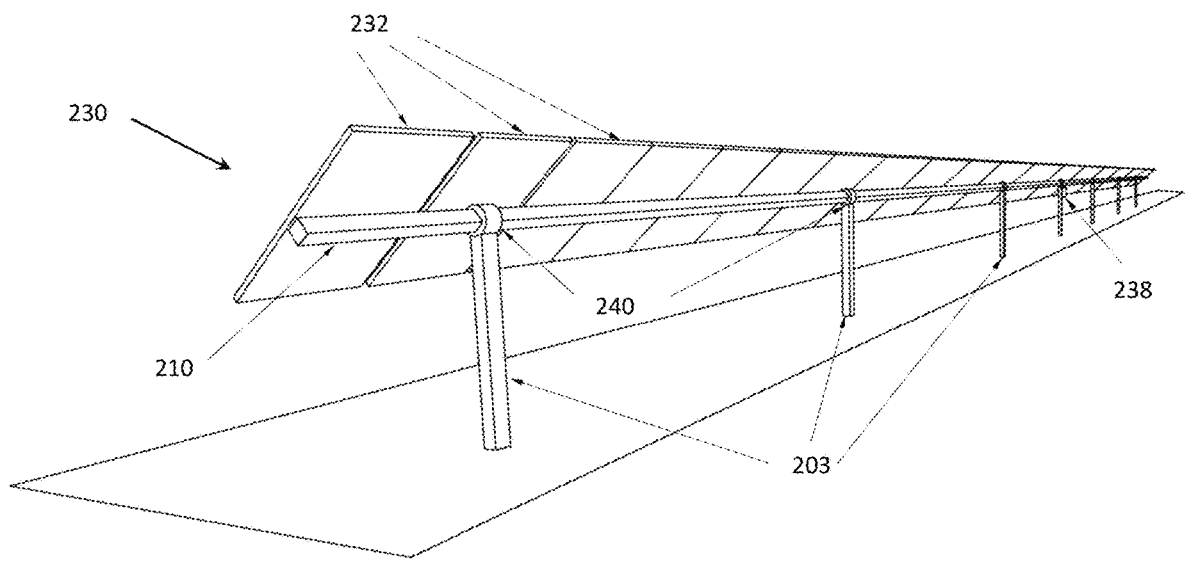
FIG. 45 illustrates an embodiment of a single axis tracker 230 comprising piles 203, an axle (torque tube) 210, solar modules 232, motor (actuator) 238 and bearings 240.

This marching algorithm is repeated until all axles 210 have either reached the objective state or rotated as far toward the objective state as possible without incurring row-to-row shading. By way of example, FIG. 44 illustrates an embodiment of three iterative marching steps for three rows of single axis trackers; namely, an initial feasible state ($s^{ini}$), a first marching step ($s_{k+1}$), and a second marching step ($s_{k+2}$). As illustrated, tracker 3 casts shade on tracker 2 after the first marching step. As a result, Trackers 2 and 3 return to the previous iteration's position and respective axle rotation angles β remain constant thereafter. Tracker 1, however, remains unshaded and continues marching toward the objective state until shading from Tracker 2 occurs or the objective state is reached.

Once the marching algorithm has completed, the energy yield optimization device preferably has a built-in function to export the final-state solution for each axle and time of the year. This can be done in a standardized interchange file formats, as a standard ASCII text file (or its tabulated equivalent CSV format file).

Alternatively, the data could be exported to a standard solution shading scene file to be read by an energy yield simulation software application. An example of such simulation software was previously described and referred to as PVSyst. Finally, the data for the final-state solution for each axle and time of the year could be exported in ASCII format to be read by the control system of the solar plant.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. An energy yield optimization device for a utility-scale photovoltaic power plant comprising a plurality of single-axis trackers, the energy yield optimization device comprising:
 a central processing unit having a memory with instructions stored therein for causing the central processing unit to incorporate a set of geometric coordinates for a plurality of non-planar single-axis trackers to calculate a final-state solution that optimizes energy yields for the plurality of non-planar single-axis trackers, the set of geometric coordinates comprising an instantaneous sun position vector $\vec{p}(A, B, C)$, a first corner positioned on a first solar module and a second solar module, wherein to calculate the final-state solution, the central processing unit executes steps comprising:
  calculating an objective-state solution, wherein the objective-state solution comprises the first solar module mounted on a single-axis tracker, the first solar module comprising an axle rotation angle β oriented to maximize power output while ignoring the effects of row-to-row shading,
  calculating an optimum-feasible solution, the optimum feasible solution applying a marching algorithm to adjust each axle rotation angle β to maximize power output and eliminate row-to-row shading, the marching algorithm comprising:
   setting an initial feasible state for an axle rotation angle β, wherein a sun position vector is coincident with a surface plane of the first solar module,
   calculating a rotation marching step by dividing an angular distance between the objective-state solution and the initial feasible state for an axle rotation angle β by k iterations,
   determining a first iterative rotation by adding at least one rotation marching step to the axle rotation angle β of the initial feasible state,
   analyzing the first iterative rotation to verify whether any mutual row-to-row shading occurs at the first iterative rotation by passing a first line parallel to $\vec{p}(A, B, C)$ through the first corner of the first solar module with the axle rotation angle β set to the first iterative rotation and checking whether the line intersects the second solar module,
   when the first line does not intersect the second solar module, then determining a second iterative rotation by adding the rotation marching step to the first iterative rotation,
   analyzing the second iterative rotation to verify whether any mutual row-to-row shading occurs at the second iterative rotation by passing a second line parallel to $\vec{p}(A, B, C)$ through the first corner of the first solar module with the axle rotation angle β set to the second iterative rotation and checking whether the second line intersects the second solar module,
   when the second line intersects the second module, the axle rotation angle β is set to the first iterative rotation,
   setting the final-state solution to include the axle rotation angle β set to the first iterative rotation, and
  exporting the final-state solution as standardized interchange file formats by one or more of: (1) writing geometric output of the final-state to a standard solution shading scene file to be read by an energy yield simulation software application, and (2) writing the final-state solution for each axle and time of the year in ASCII format to be read by the control system of the solar plant.

2. The energy yield optimization device of claim 1 wherein the calculating a rotation marching step is replaced with setting the rotational marching step between 1 and 5 degrees.

3. The energy yield optimization device of claim 1 wherein the calculating a rotation marching step is replaced with setting the rotational marching step at 1 degree.

* * * * *